United States Patent
Tomiyasu et al.

(10) Patent No.: US 9,170,727 B2
(45) Date of Patent: Oct. 27, 2015

(54) IMAGE PROCESSING APPARATUS, DISPLAY METHOD, AND COMPUTER-READABLE STORAGE MEDIUM STORING DISPLAY PROGRAM

(75) Inventors: Kazuhiro Tomiyasu, Toyokawa (JP); Taketoshi Yamahata, Toyokawa (JP); Koichi Amiya, Anjo (JP); Tomoko Maruyama, Toyokawa (JP)

(73) Assignee: KONICA MINOLTA BUSINESS TECHNOLOGIES, INC., Chiyoda-Ku, Tokyo (JP)

( * ) Notice: Subject to any disclaimer, the term of this patent is extended or adjusted under 35 U.S.C. 154(b) by 655 days.

(21) Appl. No.: 13/232,289

(22) Filed: Sep. 14, 2011

(65) Prior Publication Data
US 2012/0069396 A1   Mar. 22, 2012

(30) Foreign Application Priority Data
Sep. 21, 2010   (JP) ................. 2010-210612

(51) Int. Cl.
G06F 3/12        (2006.01)
G06F 3/0488      (2013.01)
G06F 3/0485      (2013.01)
H04N 1/00        (2006.01)

(52) U.S. Cl.
CPC .......... G06F 3/0488 (2013.01); G06F 3/04855 (2013.01); H04N 1/00411 (2013.01); H04N 1/00413 (2013.01); H04N 1/00469 (2013.01); H04N 1/00474 (2013.01); *H04N 2201/0094* (2013.01)

(58) Field of Classification Search
None
See application file for complete search history.

(56) References Cited

U.S. PATENT DOCUMENTS

| | | | |
|---|---|---|---|
| 6,697,090 B1 * | 2/2004 | Nagasaka et al. | 715/769 |
| 7,554,684 B1 * | 6/2009 | Senoo et al. | 358/1.15 |
| 7,925,994 B2 * | 4/2011 | Olsen et al. | 715/841 |
| 8,218,184 B2 * | 7/2012 | Imaoka | 358/1.15 |
| 2004/0119683 A1 * | 6/2004 | Warn et al. | 345/156 |
| 2004/0190057 A1 | 9/2004 | Takahashi et al. | |
| 2006/0143286 A1 | 6/2006 | Aoki et al. | |
| 2006/0238793 A1 | 10/2006 | Akashi et al. | |

(Continued)

FOREIGN PATENT DOCUMENTS

| | | |
|---|---|---|
| CN | 1819613 A | 8/2006 |
| CN | 101241426 A | 8/2008 |
| EP | 1835717 A2 | 9/2007 |

(Continued)

OTHER PUBLICATIONS

Chinese Office Action (Grounds for Rejection) dated Nov. 13, 2013, issued in corresponding Chinese Patent Application No. 2013110800937570 and an English Translation thereof of the Chinese Office Action. (13 pgs).

(Continued)

*Primary Examiner* — Ashish K Thomas
(74) *Attorney, Agent, or Firm* — Buchanan Ingersoll & Rooney PC

(57) ABSTRACT

An image processing apparatus is provided that includes a display, a memory storing a plurality of functions in such a manner that associates the functions each with one of a plurality of categories, and a controller for causing the display to array and display objects representing respective functions that are a part of a plurality of functions. In response to a command to change the displayed objects, the controller changes the displayed objects on category basis.

30 Claims, 15 Drawing Sheets

(56) References Cited

U.S. PATENT DOCUMENTS

2007/0133882 A1  6/2007  Matsuno
2010/0083181 A1  4/2010  Matsushima et al.

FOREIGN PATENT DOCUMENTS

| | | |
|---|---|---|
| JP | 2004-029292 A | 1/2004 |
| JP | 2004-279605 A | 10/2004 |
| JP | 2009-009255 A | 1/2009 |
| JP | 2010-8752 A | 1/2010 |
| JP | 2010-086327 A | 4/2010 |

OTHER PUBLICATIONS

Office Action (Notice of Grounds of Rejection) dated Jul. 24, 2012, issued in corresponding Japanese Patent Application No. 2010-210612, and an English Translation thereof. (4 pages).

* cited by examiner

FIG.9
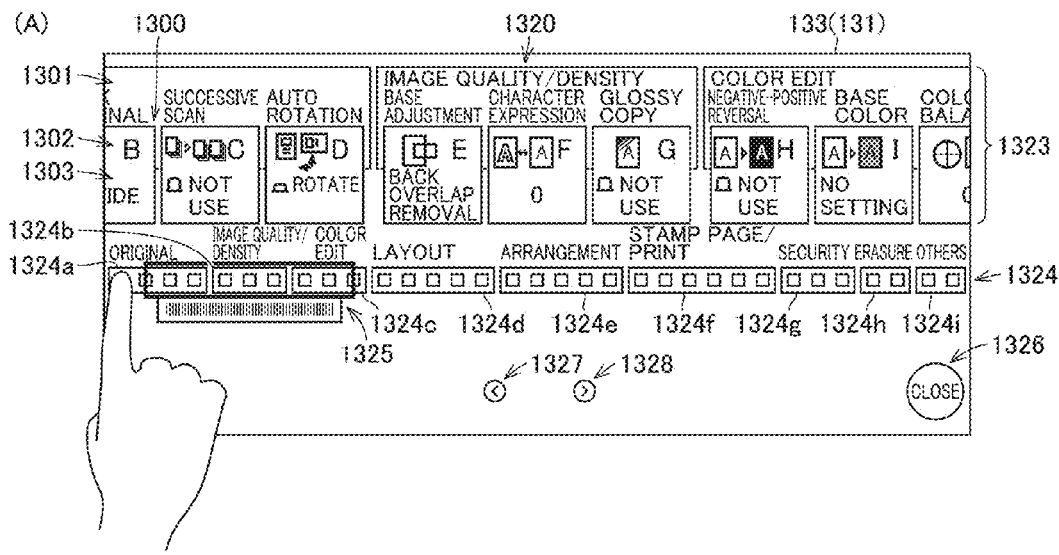
(A)
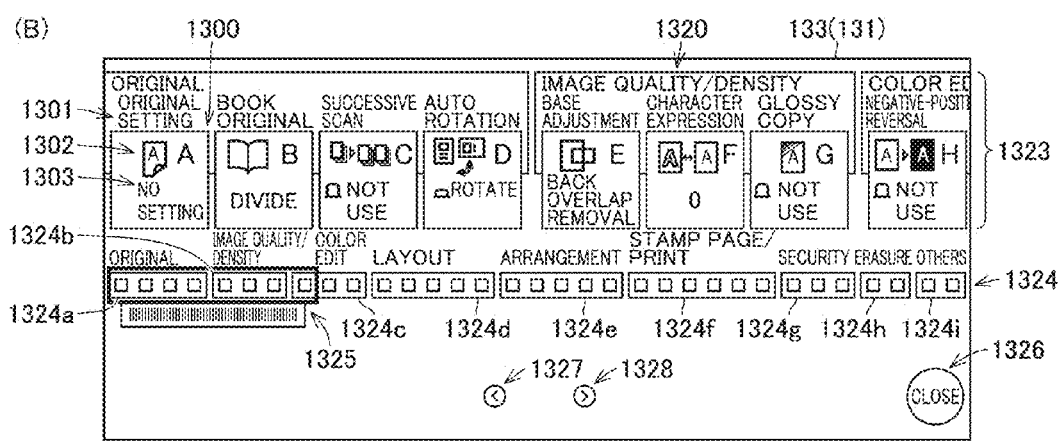
(B)

FIG.10
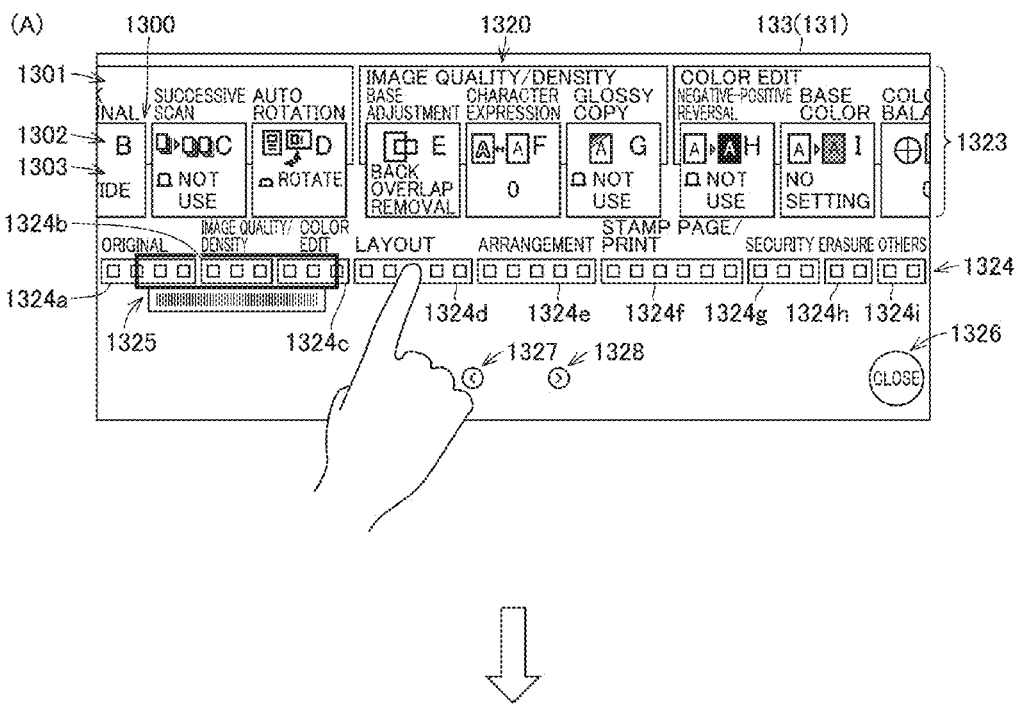
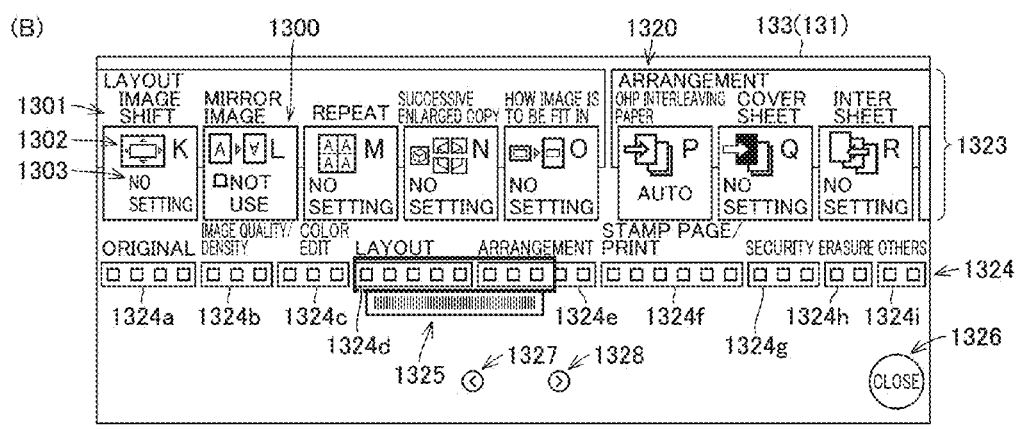

FIG.13
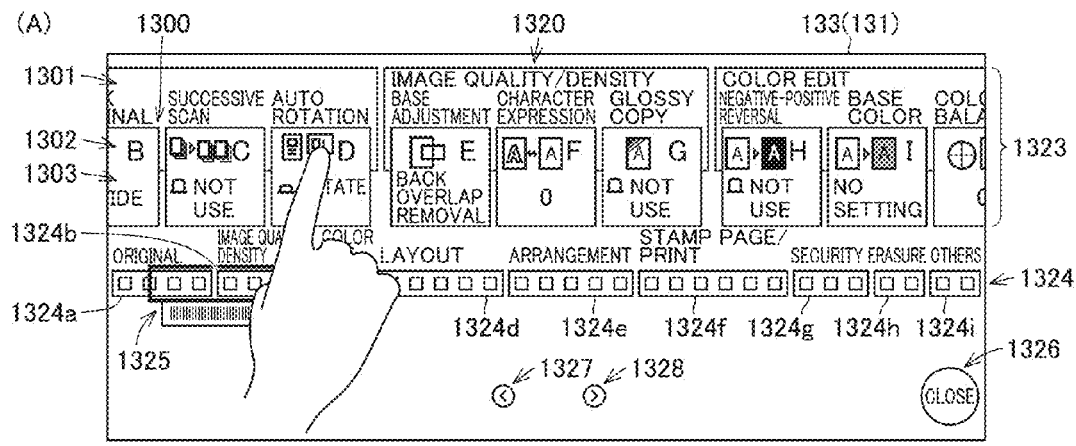
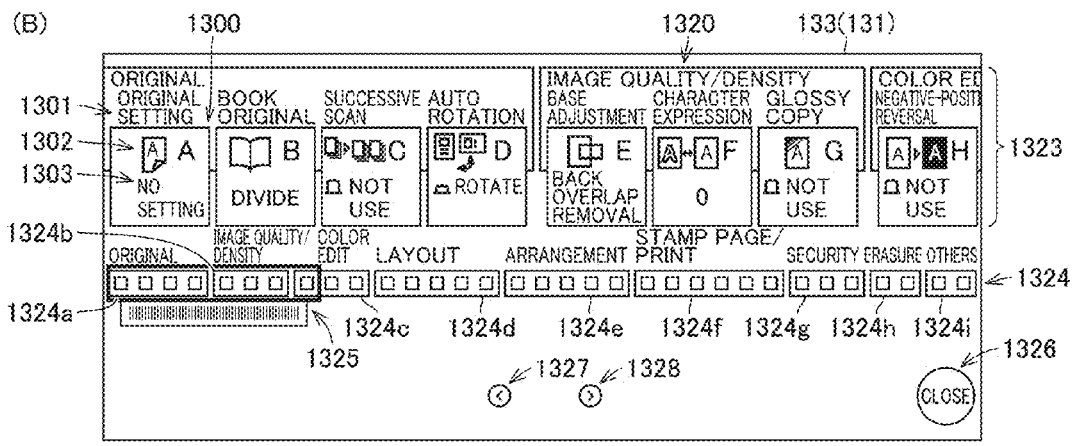

FIG.14
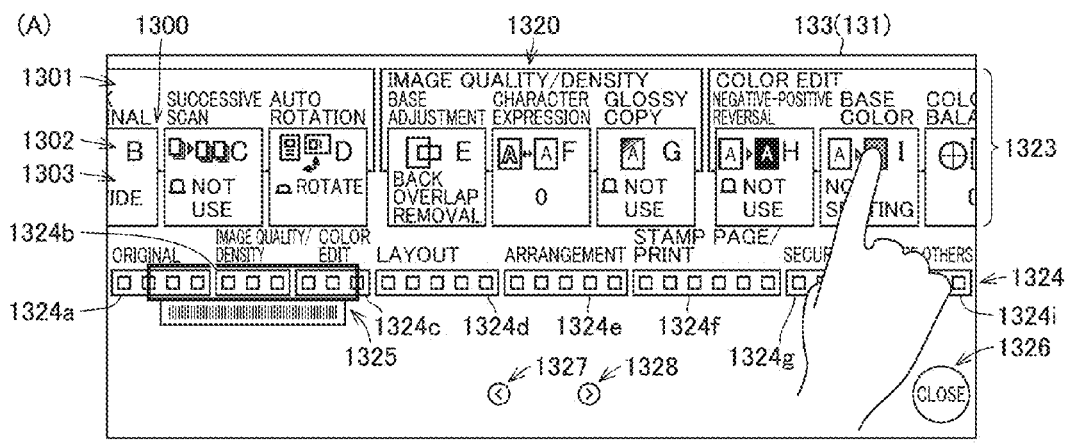
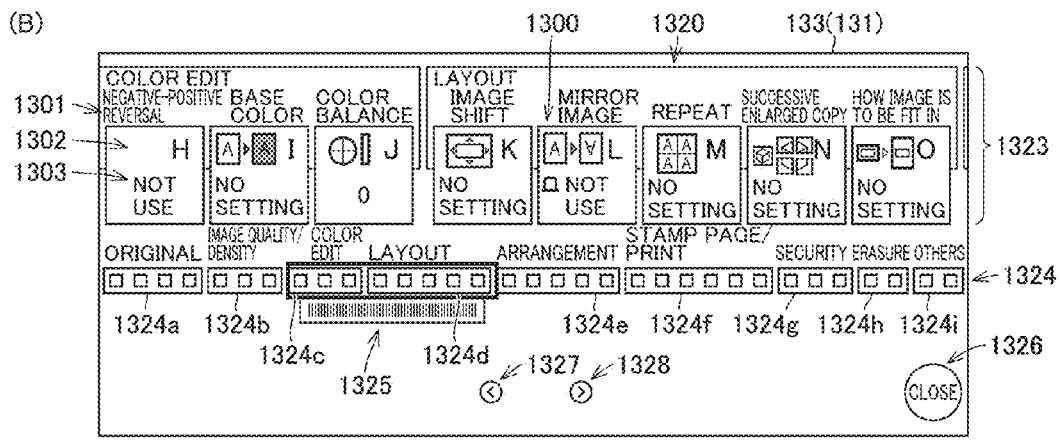

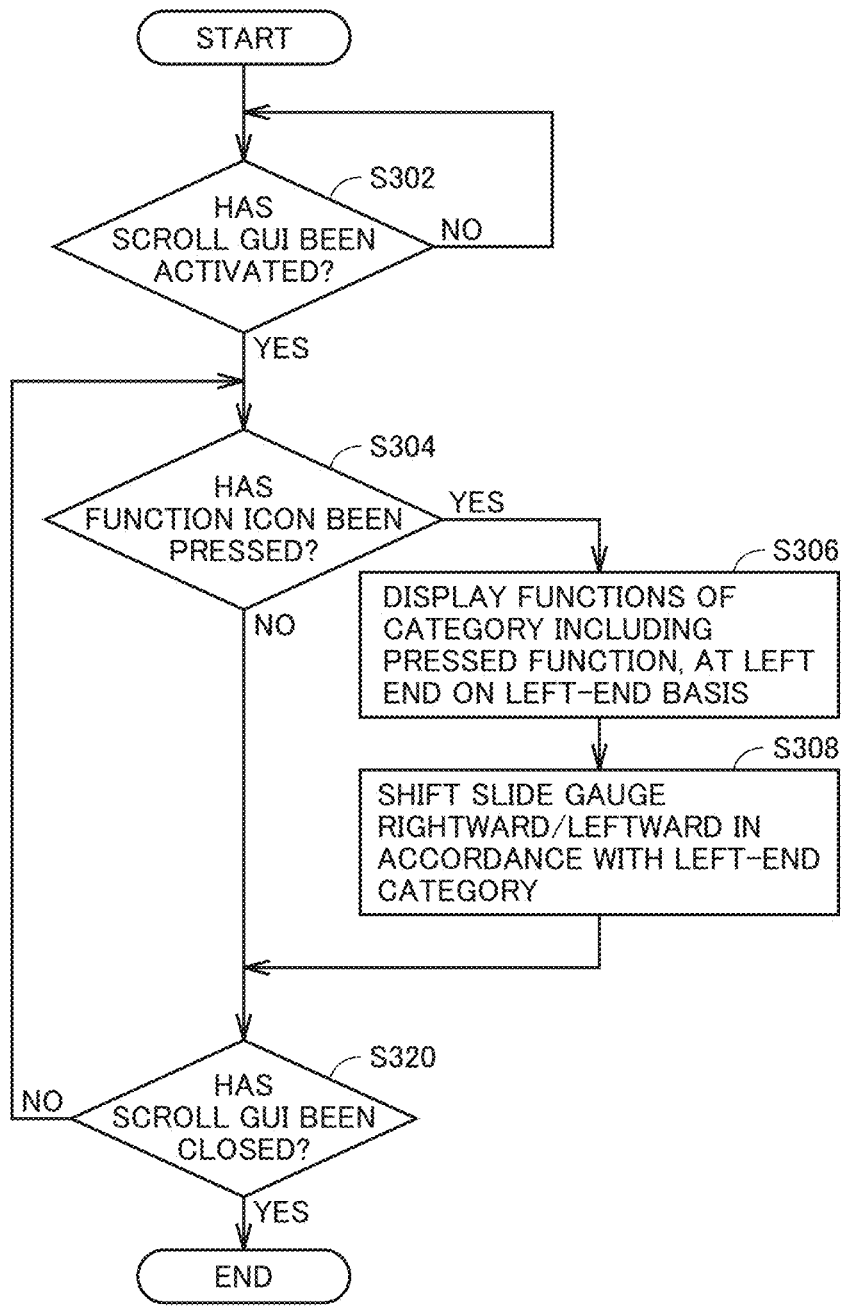

IMAGE PROCESSING APPARATUS, DISPLAY METHOD, AND COMPUTER-READABLE STORAGE MEDIUM STORING DISPLAY PROGRAM

This application is based on Japanese Patent Application No. 2010-210612 filed with the Japan Patent Office on Sep. 21, 2010, the entire content of which is hereby incorporated by reference.

BACKGROUND OF THE INVENTION

1. Field of the Invention

The present invention relates to a user interface technique for accepting settings concerning various functions of an image processing apparatus.

2. Description of the Related Art

A so-called multifunction machine (hereinafter referred to as "MFP (Multi-Functional Peripheral)" having multiple functions such as facsimile function and print function has been known. Increased functions of the MFP enable a user to use more functions with a single MFP. An operation panel of the MFP, however, has a limited size, and it is therefore difficult for the operation panel to simultaneously display keys corresponding to all available functions. If all function keys are to be displayed simultaneously on the operation panel, each key is made smaller and the space between keys is inevitably narrowed, resulting in increased operation errors and deteriorated usability.

Regarding this issue, Japanese Laid-Open Patent Publication No. 2010-008752 discloses an operation display apparatus for an electronic device as well as an image processing apparatus. According to Japanese Laid-Open Patent Publication No. 2010-008752, a function select display unit arranges, within a predetermined region, a plurality of function select keys used for selecting any of multiple functions of the electronic device. A mode change instruction unit has a mode change key placed outside the predetermined region for accepting an instruction to change a mode for preset function select keys. When the mode change key is operated, a change control unit changes the mode of the function select display unit, based on a mode change function allocated in advance to the mode change key, without changing the state of arrangement of the function select keys.

The technique disclosed in Japanese Laid-Open Patent Publication No. 2010-008752, however, is implemented on the condition that all selectable functions can be displayed simultaneously on the operation panel (see for example FIGS. 3, 5, and 6 of Japanese Laid-Open Patent Publication No. 2010-008752). The technique thus does not take into consideration the case where it is impossible to display all functions at the same time.

In the case where it is impossible for the operation panel to simultaneously display all functions to be displayed, namely the case where the operation panel can display only a part of the functions to be displayed, a technique may be used that allows a screen displayed on the operation panel to be scrolled so that the functions to be displayed are displayed in turn. When such a technique of scrolling the screen is used, it is often the case that all functions to be displayed are classified into categories based on the relevance and functions belonging to the same category are arranged and displayed close to each other.

As such a technique, a user's scroll operation for example may cause the operation panel to display only a part of the functions that belong to a category of the user's interest. Under such a situation, if the user is unaccustomed to operating the MFP, the user may erroneously regard the functions currently displayed on the operation panel as all functions belonging to the category of the user's interest. The user may accordingly end a setting operation without taking into consideration other functions (that are not currently displayed on the operation panel).

If the functions that are not displayed on the operation panel include functions that are more preferable for the user than the currently displayed functions, the user may not be aware of the presence of the most preferable function belonging to the category of interest and accordingly select a function which is not the most preferable function. Consequently, the user cannot allow a job to be executed on a satisfactory setting condition.

SUMMARY OF THE INVENTION

In accordance with an aspect of the present invention, an image processing apparatus is provided that includes a display, a memory storing a plurality of functions in such a manner that associates the functions each with one of a plurality of categories, and a controller for causing the display to array and display objects representing respective functions that are a part of the plurality of functions, so that the objects are arrayed category by category and the objects can be scrolled in a direction in which the objects are arrayed. In response to a command to change the displayed objects, the controller refers to the memory to change the displayed objects on category basis.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 9 is a first conceptual diagram illustrating a second scroll operation for function badges.

FIG. 10 is a second conceptual diagram illustrating the second scroll operation for function badges.

FIG. 13 is a first conceptual diagram illustrating a third scroll operation for function badges.

FIG. 14 is a second conceptual diagram illustrating the third scroll operation for function badges.

FIG. 15 is a flowchart illustrating the third scroll operation for function badges in image processing apparatus 100 according to the present embodiment.

DESCRIPTION OF THE PREFERRED EMBODIMENTS

Figure 1:
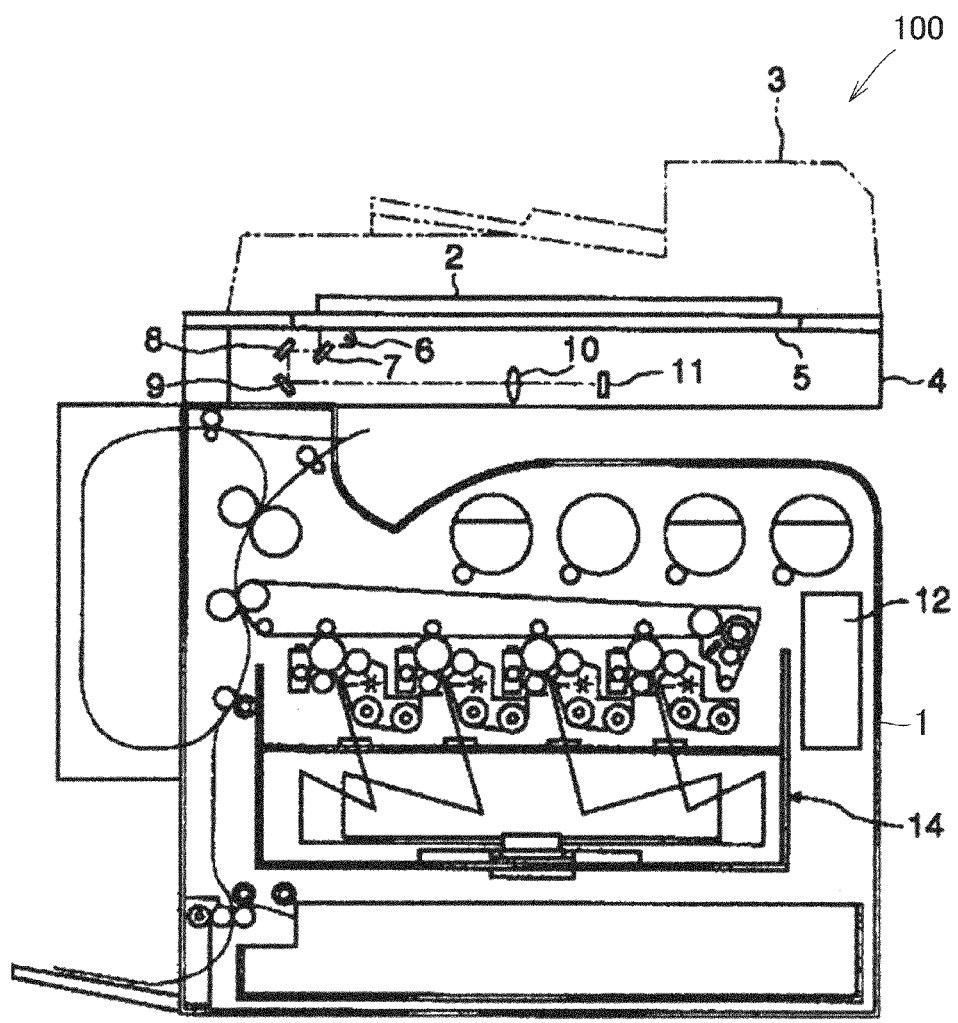
FIG. 1 is a front cross-sectional view representing an overall configuration of an image processing apparatus 100 according to the present embodiment.

An embodiment of the present invention will be described hereinafter with reference to the drawings. In the description below, the same components are denoted by the same reference characters. They are named and function identically as well. Therefore, a detailed description thereof will not be repeated.

<Overall Configuration of Image Processing Apparatus 100>

Figure 2:
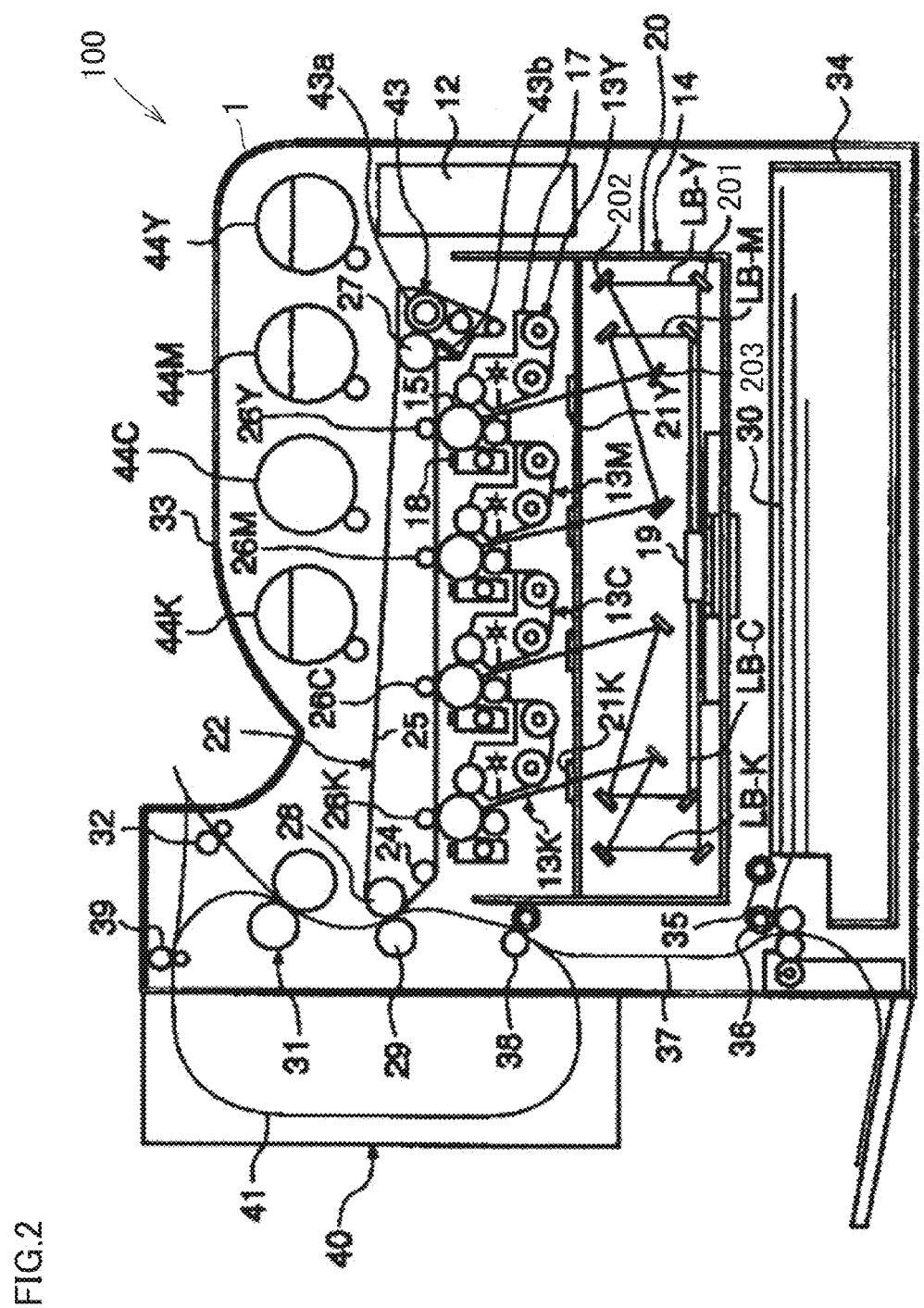
FIG. 2 is a front cross-sectional view representing a configuration of a print engine portion of image processing apparatus 100 according to the present embodiment.

One manner of an overall configuration of an image processing apparatus 100 according to the present embodiment will initially be described. FIG. 1 is a front cross-sectional view representing the overall configuration of image processing apparatus 100 according to the present embodiment. FIG. 2 is a front cross-sectional view representing a configuration of a print engine portion of image processing apparatus 100 according to the present embodiment.

In the present embodiment, a tandem-type digital color multi-functional peripheral will be described by way of example of image processing apparatus 100. It is noted that the digital color multi-functional peripheral can generally execute jobs such as a scan job for scanning an image of a set document and storing the image in an HDD (Hard Disk Drive) or the like, a copy job for further printing the image on a sheet of paper or the like, a print job for printing on a sheet of paper based on a print instruction from an external terminal such as a personal computer (hereinafter also referred to as PC), a facsimile job for receiving facsimile data from a facsimile machine or the like and storing the data in the HDD or the like, and an HDD print job (a BOX print job) for printing an image stored in the HDD or the like on a sheet of paper or the like.

Referring to FIGS. 1 and 2, in an upper portion of a main body 1, an automatic document feeder (ADF) 3 for automatically transporting documents 2 one by one separately and an image scanner 4 for scanning an image on document 2 transported by automatic document feeder 3 are arranged. Image scanner 4 irradiates document 2 placed on a platen glass 5 with a light source 6. Image scanner 4 scans for exposure, a reflected light image from document 2 on an image scanning element 11 implemented by a CCD (Charge Coupled Device) or the like through a reduction optical system constituted of a full rate mirror 7, half rate mirrors 8, 9 and an imaging lens 10. Image scanner 4 uses image scanning element 11 to scan a color material reflected light image of document 2 at a prescribed dot density (for example, 16 dots/mm).

Image scanner 4 has such document scanning functions as scanning a FAX transmission document, Scan to E-Mail, Box saving, and the like. A color material reflected light image of document 2 scanned by image scanner 4 is sent to an image processing portion 12, for example, as document reflectance data of three colors of red (R), green (G), blue (B) (each having 8 bits).

Image processing portion 12 subjects the reflectance data of document 2 to prescribed image processing such as shading correction, position displacement correction, lightness/color space conversion, gamma correction, frame erasure, color/shift edition, and the like. In addition, image processing portion 12 can also subject image data sent from a personal computer or the like to prescribed image processing. The image data subjected to prescribed image processing by image processing portion 12 is again converted by image processing portion 12 to document reproduction color material gradation data of four colors of yellow (Y), magenta (M), cyan (C), black (K) (each having 8 bits). The image data is sent to a print head 14, which performs image exposure on image forming 13Y, 13M, 13C, 13K of respective colors of yellow (Y), magenta (M), cyan (C), black (K). Print head 14 serving as an image exposure apparatus carries out image exposure using a laser beam LB, in accordance with the document reproduction color material gradation data of a prescribed color.

In the case of a tandem-type digital color multi-functional peripheral, in main body 1, as shown in FIGS. 1 and 2, four image forming units 13Y, 13M, 13C, 13K of yellow (Y), magenta (M), cyan (C), black (K) are arranged in parallel at regular intervals in the horizontal direction. These four image forming units 13Y, 13M, 13C, 13K are all configured similarly to one another.

Referring to FIG. 2, each of four image forming units 13Y, 13M, 13C, 13K is constituted of a photoconductor drum 15 serving as an image carrier rotationally driven at a prescribed speed, a charging roller for primary charging that uniformly charges a surface of this photoconductor drum 15, print head 14 serving as an image exposure apparatus for forming by exposure, an image corresponding to a prescribed color on a surface of photoconductor drum 15 to thereby form an electrostatic latent image, a developer 17 for developing the electrostatic latent image formed on photoconductor drum 15 with toner of a prescribed color, and a cleaning apparatus 18 for cleaning the surface of photoconductor drum 15.

As shown in FIGS. 1 and 2, print head 14 is configured in common to four image forming units 13Y, 13M, 13C, 13K. Print head 14 modulates four semiconductor lasers (not shown) in accordance with the document reproduction color material gradation data of respective colors and emits laser beams LB-Y, LB-M, LB-C, LB-K from the respective semiconductor lasers in accordance with the gradation data. It is noted that print head 14 above may individually be configured for each of the plurality of image forming units.

One rotating polygon mirror 19 is irradiated with laser beams LB-Y, LB-M, LB-C, LB-K emitted from the four respective semiconductor lasers and it deflects and scans the laser beams. Here, among laser beams LB-Y, LB-M, LB-C, LB-K emitted from the four respective semiconductor lasers above, laser beam LB-Y and laser beam LB-M are emitted toward one side surface of rotating polygon mirror 19 and other laser beam LB-C and laser beam LB-K are emitted toward the other side surface of rotating polygon mirror 19.

Consequently, laser beams LB-Y, LB-M and laser beams LB-C, LB-K are opposite to each other in a direction of deflection and scanning by rotating polygon mirror 19. Laser beams LB-Y, LB-M, LB-C, LB-K deflected and scanned by rotating polygon mirror 19 are reflected by a plurality of reflection mirrors 201 to 203 through an f-O lens (not shown). Laser beams LB-Y, LB-M, LB-C, LB-K are scanned for exposure onto photoconductor drums 15 in respective image forming units through a window 21 from diagonally below.

Image processing portion 12 successively outputs image data of respective colors to print head 14 provided in common to image forming units 13Y, 13M, 13C, 13K of respective colors of yellow (Y), magenta (M), cyan (C), black (K), and laser beams LB-Y, LB-M, LB-C, LB-K emitted from this print head 14 in accordance with the image data are scanned for exposure onto the respective surfaces of corresponding photoconductor drums 15. An electrostatic latent image is thus formed.

Then, the electrostatic latent image formed on photoconductor drum 15 is developed by developer 17 as a toner image of each color of yellow (Y), magenta (M), cyan (C), black (K), as shown in FIGS. 1 and 2. The toner images of respective colors of yellow (Y), magenta (M), cyan (C), black (K) are multiply transferred by primary transfer rollers 26 onto an intermediate transfer belt 25 of an intermediate transfer belt unit 22 arranged above each image processing unit 13Y, 13M, 13C, 13K.

Intermediate transfer belt 25 is wound around a drive roller 27, a back-up roller 28 and a tension roller 24 at a constant tension. Intermediate transfer belt 25 is circulated and driven in a prescribed direction at a prescribed speed by drive roller 27 rotationally driven by a dedicated drive motor (not shown) having excellent constant speed property. For example, a belt made by forming a film of a synthetic resin such as flexible polyimide like a band and connecting opposing ends of the synthetic resin film formed like a band with such means as welding to thereby form the film like an endless belt is employed as intermediate transfer belt 25.

The toner image of respective colors of yellow (Y), magenta (M), cyan (C), black (K) multiply transferred onto intermediate transfer belt 25 above is transferred onto a sheet of transfer paper 30 serving as a transfer material, by a secondary transfer roller 29 pressed against back-up roller 28 with the intermediate transfer belt being interposed, by means of pressing force and electrostatic force. Transfer paper 30 onto which the toner images of respective colors have been transferred is transported to a fixer 31 located above.

Secondary transfer roller 29 is located on the side of back-up roller 28. Secondary transfer roller 29 secondarily collectively transfers the toner images of respective colors onto transfer paper 30 transported from below to above. Then, transfer paper 30 onto which the toner images of respective colors have been transferred is subjected to a fixation process with heat and pressure by fixer 31 and thereafter ejected on an ejection tray 33 provided in the upper portion of main body 1 by an ejection roller 32.

In the present embodiment, transfer paper 30 having a prescribed size is transported from a paper feed cassette 34 through a paper transport path 37 to a register roller 38 by a paper feed roller 35 and a roller pair 36 for separated paper transport, and stopped there. Transfer paper 30 is sent to a secondary transfer position of intermediate transfer belt 25 by register roller 38 that rotates at prescribed timing.

It is noted that, in the case of image formation on opposing surfaces of transfer paper 30 by means of the digital color multi-functional peripheral, transfer paper 30 having one surface on which an image has been fixed is not directly ejected to ejection tray 33 by ejection roller 32. The digital color multi-functional peripheral switches the direction of transport of transfer paper 30 by using a switching gate (not shown) and transports transfer paper 30 to a duplex transport unit 40 through a roller pair 39 for paper transport.

Duplex transport unit 40 transports transfer paper 30 again to register roller 38 by using a transport roller pair (not shown) provided along a transport path 41, with transfer paper 30 being turned over. Then, after the image is transferred and fixed onto the back surface of transfer paper 30, transfer paper 30 is ejected on ejection tray 33. In FIGS. 1 and 2, 44Y, 44M, 44C, 44K represent toner cartridges for supplying toner of prescribed colors to developers 17 of respective colors of yellow (Y), magenta (M), cyan (C), black (K).

<Hardware Configuration of Image Processing Apparatus 100>

Figure 3:
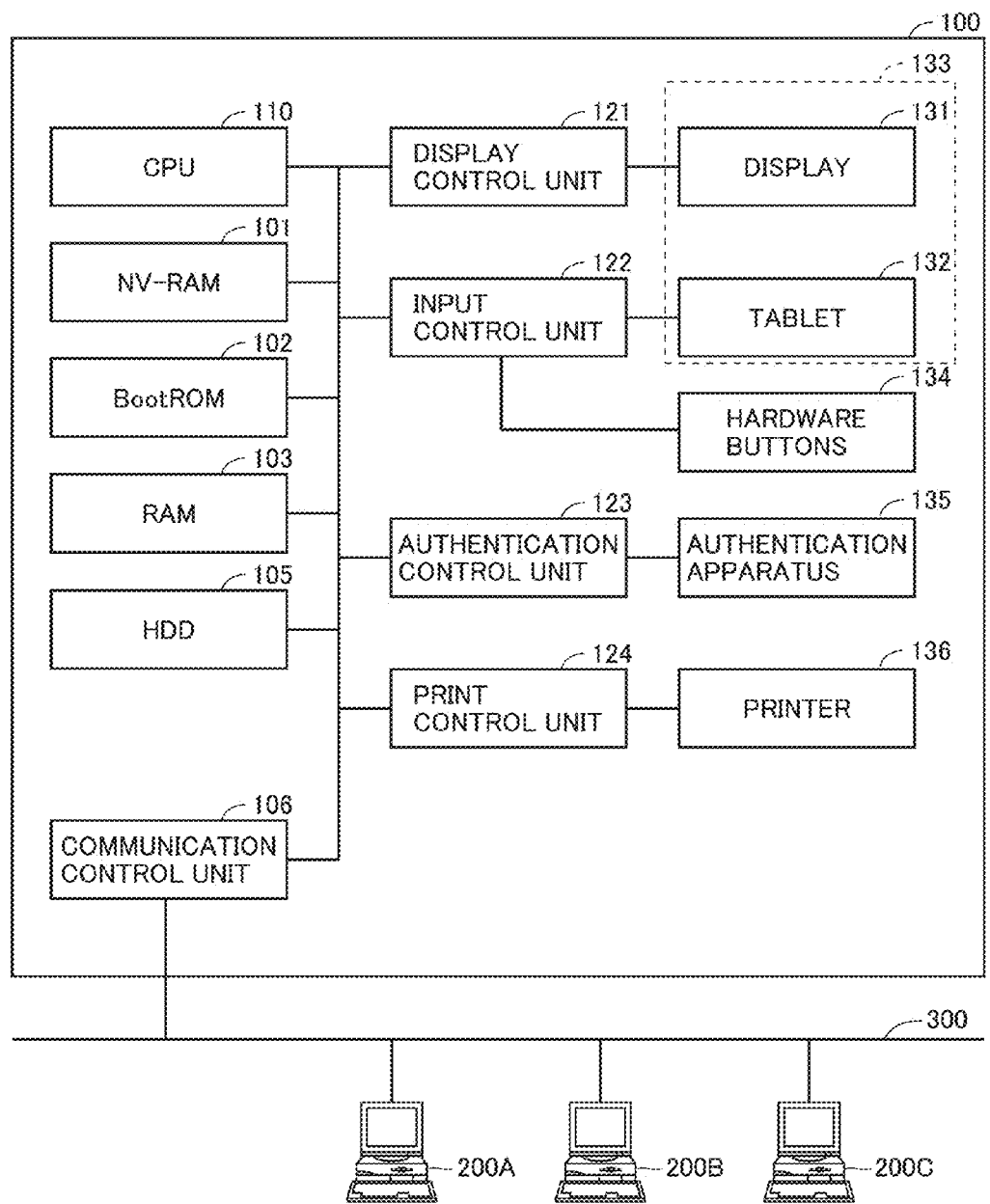
FIG. 3 is a block diagram showing a hardware configuration of image processing apparatus 100 according to the present embodiment.

A hardware configuration of image processing apparatus 100 will now be described. FIG. 3 is a block diagram showing the hardware configuration of image processing apparatus 100 according to the present embodiment.

Referring to FIG. 3, image processing apparatus 100 includes a display 131, a tablet 132, hardware buttons 134, an authentication apparatus 135, and a printer 136.

As display 131, a liquid crystal display (LCD), a CRT (Cathode-Ray Tube) display or the like is used for example. In the present embodiment, tablet 132 is mounted on the surface of display 131. In other words, display 131 and tablet 132 constitute a touch panel 133.

A description of hardware buttons 134 will be given later herein. Authentication apparatus 135 includes a contact/non-contact IC card authentication apparatus, a finger vein authentication apparatus, and the like. Printer 136 in FIG. 3 refers to the printer engine described above in connection with FIGS. 1 and 2.

Image processing apparatus 100 includes a CPU (Central Processing Unit) 110. CPU 110 is connected to an NV-RAM (Non Volatile-Random Access Memory) 101, a Boot ROM (Read Only Memory) 102, a RAM 103, a hard disk drive (HDD) 105, a communication control unit (communication interface) 106, a display control unit 121, an input control unit 122, an authentication control unit 123, and a print control unit 124, through a bus.

CPU 110 controls the overall operation of image processing apparatus 100 based on data stored in NV-RAM 101, Boot ROM 102, RAM 103, and hard disk drive 105.

RAM 103 (volatile memory) provides a work area for CPU 110 to operate. HDD 105 (non-volatile memory) stores image data or the like of which image is to be formed, when image processing apparatus 100 executes a copy job or a print job. In addition, HDD 105 stores (saves in BOX) image data scanned in a scan job so that the image data can subsequently be output.

CPU 110 causes touch panel 133 (display 131) to display a plurality of function badges (objects representing respective functions) 1300 each representing its function among a plurality of functions (see FIG. 4), based on a program developed in RAM 103. Through touch panel 133, CPU 110 changes function badges 1300 to be displayed, in response to an operational command from a user. In image processing apparatus 100 according to the present embodiment, RAM 103 stores a table showing a correspondence between a plurality of categories and a plurality of function badges (see FIG. 5). Categories herein refer to groups into which function badges 1300 are classified on the basis of the type of their functions.

<Overview of Operations Relevant to User Interface>

A description will be given below of an overview of operations relevant to user interface. In the present embodiment, CPU 110 uses touch panel 133 to implement the user interface as described below.

Figure 4:
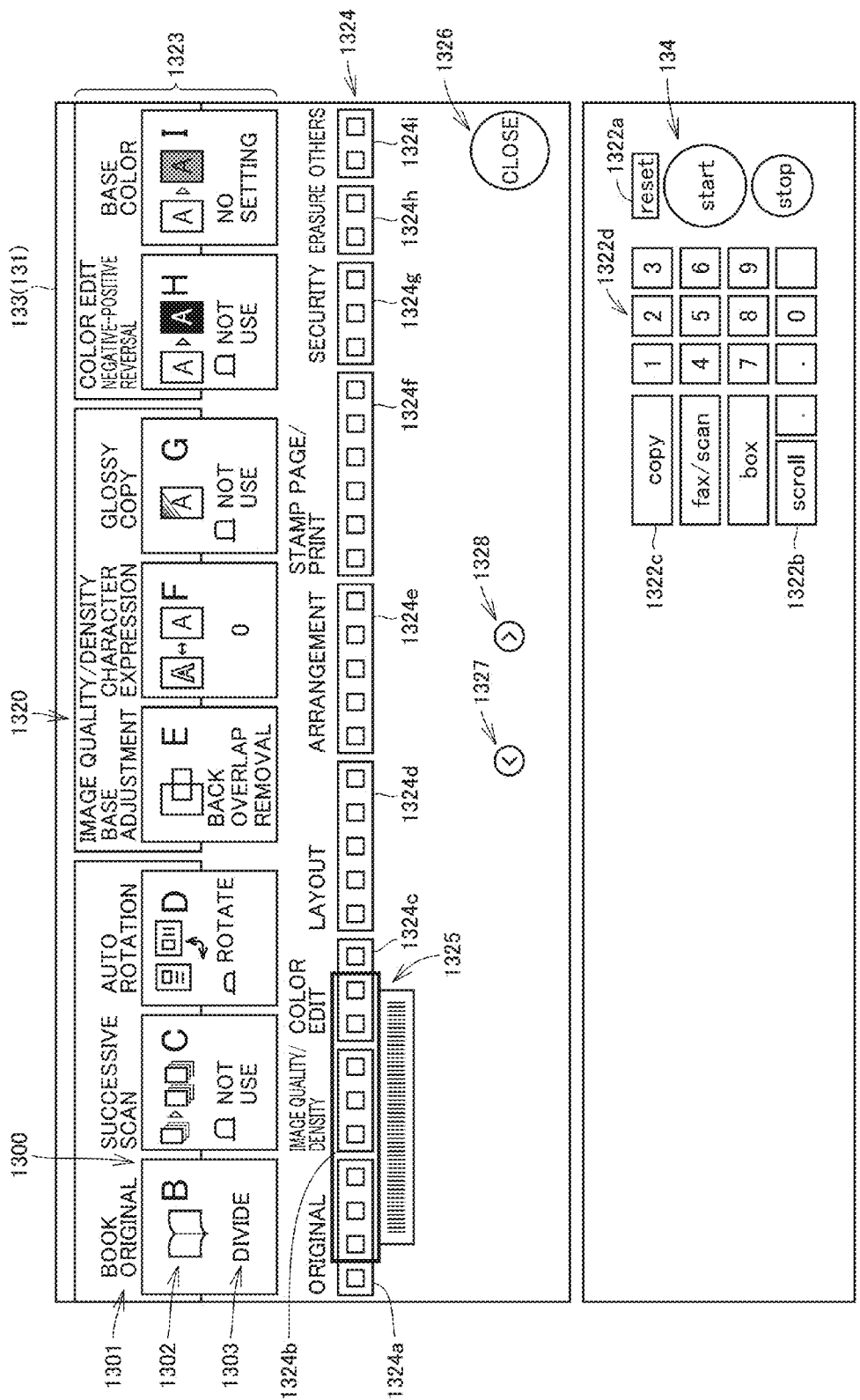
FIG. 4 is a conceptual diagram showing a touch panel 133 that displays function badges 1300 concerning image quality/density in a central area according to the present embodiment.
Figure 5:
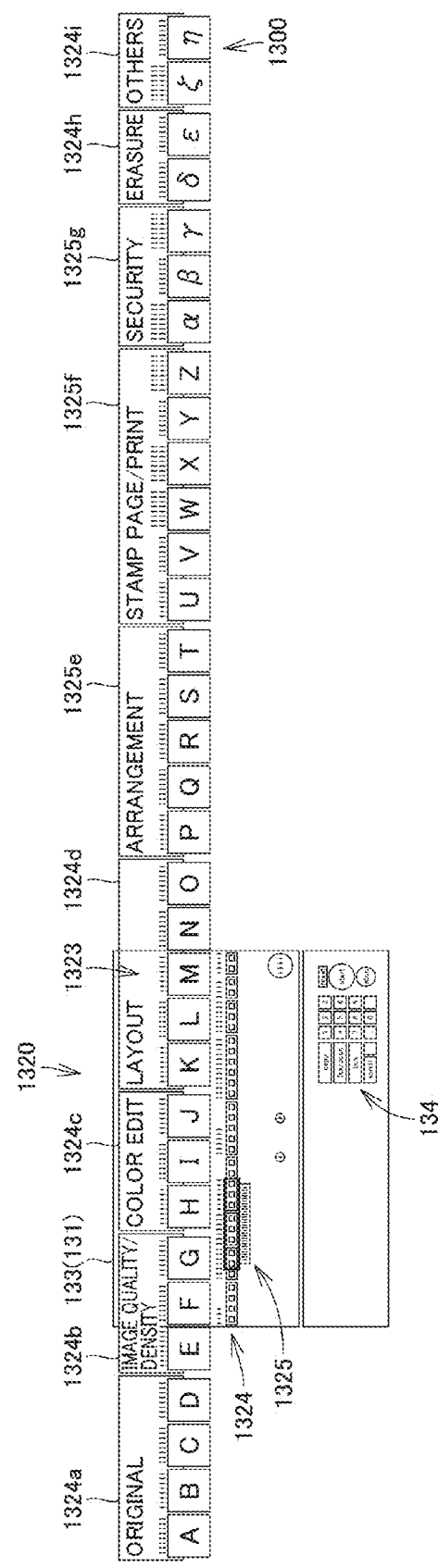
FIG. 5 is a conceptual diagram showing a relation between categories, function badges, and display areas according to the present embodiment.

FIG. 4 is a conceptual diagram showing an example of touch panel 133 displaying function badges 1300. FIG. 5 is a conceptual diagram showing a relation between categories, function badges, and display areas of touch panel 133 (display 131) according to the present embodiment.

Referring to FIG. 4, in image processing apparatus 100 according to the present embodiment, an operation unit is constituted of touch panel 133 and hardware buttons 134. CPU 110 causes touch panel 133 to display a screen for informing a user of a state of image processing apparatus 100 and a screen to be touched by a user with a finger so as to allow a command to be input to image processing apparatus 100.

More specifically, touch panel 133 displays a plurality of function badges 1300 in such a manner that enables them to be selected. In the present embodiment, CPU 110 causes touch panel 133 to display eight function badges 1300.

Function badges 1300 are each an image showing a function of image processing apparatus 100. One function badge 1300 corresponds to one of the functions of image processing apparatus 100. Function badge 1300 is made up of a function type 1301 representing its corresponding function, an illustration 1302 representing the function, and a detail 1303 of the badge which is currently selected. A user touches this function badge 1300 to thereby input a detail (operating condition) of the badge to image processing apparatus 100.

One method for selecting the detail of the badge is to switch "ON" to "OFF" or "OFF" to "ON" in response to a touch of function badge 1300. Function badge 1300 thus implements a so-called toggle key. For example, function badge 1300 corresponding to "glossy copy" is a toggle key. Then, each time the key is touched, "use" and "not use" (the glossy copy) are selected by turns.

Another method for selecting the detail is to display on touch panel 133 a new screen for the detail to be selected, in response to a touch of function badge 1300, so that a user's selection is accepted through the screen.

Touch panel 133 includes a region displaying these multiple function badges 1300 and this region is herein referred to as a function badge area 1323. Function badge area 1323 displays a part of all function badges 1300 of image processing apparatus 100. In FIG. 4, function badges 1300 corresponding to "book original," "successive scan," "auto rotation," "base adjustment," "character expression," "glossy copy," "negative-positive reversal," and "base color" are displayed. CPU 110 causes a scroll track 1324 and a slide gauge 1325 to be displayed below function badge area 1323. The scroll track and the slide gauge will be described later herein.

For image processing apparatus 100 according to the present embodiment, a correspondence between the function badges and the categories is defined in the manner as shown in FIG. 5. Data defining the correspondence between the categories and the function badges as shown in FIG. 5 is stored in a nonvolatile memory such as Boot ROM 102 or HDD 105. Image processing apparatus 100 has 33 function badges 1300. In the following, they are also expressed as function badge 1300A to function badge 1300η when function badges 1300 are to be distinguished from each other.

Function badge 1300A to function badge 1300η each belong to one of nine categories: a category of original 1324a, a category of image quality/density 1324b, a category of color edit 1324c, a category of layout 1324d, a category of arrangement 1324e, a category of stamp page/print 1324f, a category of security 1324g, a category of erasure 1324h, and a category of others 1324i. The function badges are arranged on the category basis. In other words, function badges belonging to the same category are arranged in close proximity to each other.

Referring to FIG. 4, in the present embodiment, images representing nine categories 1324a to 1324i constitute scroll track 1324.

In function badge area 1323, eight successive function badges 1300 of function badge 1300A to function badge 1300η are displayed. A user utilizes slide gauge 1325 to specify a range of function badges 1300 to be displayed in function badge area 1323. In some cases, touch panel 133 displays a part of one function badge 1300 without displaying the remaining part of this function badge, depending on the position of slide gauge 1325 (function badge 1300B and function badge 1300J in FIG. 6).

Scroll track 1324 represents function badge 1300A to function badge 1300η across its whole length. One square region (hereinafter referred to as "marker") shown on scroll track 1324 corresponds to one function badge 1300.

Figure 6:
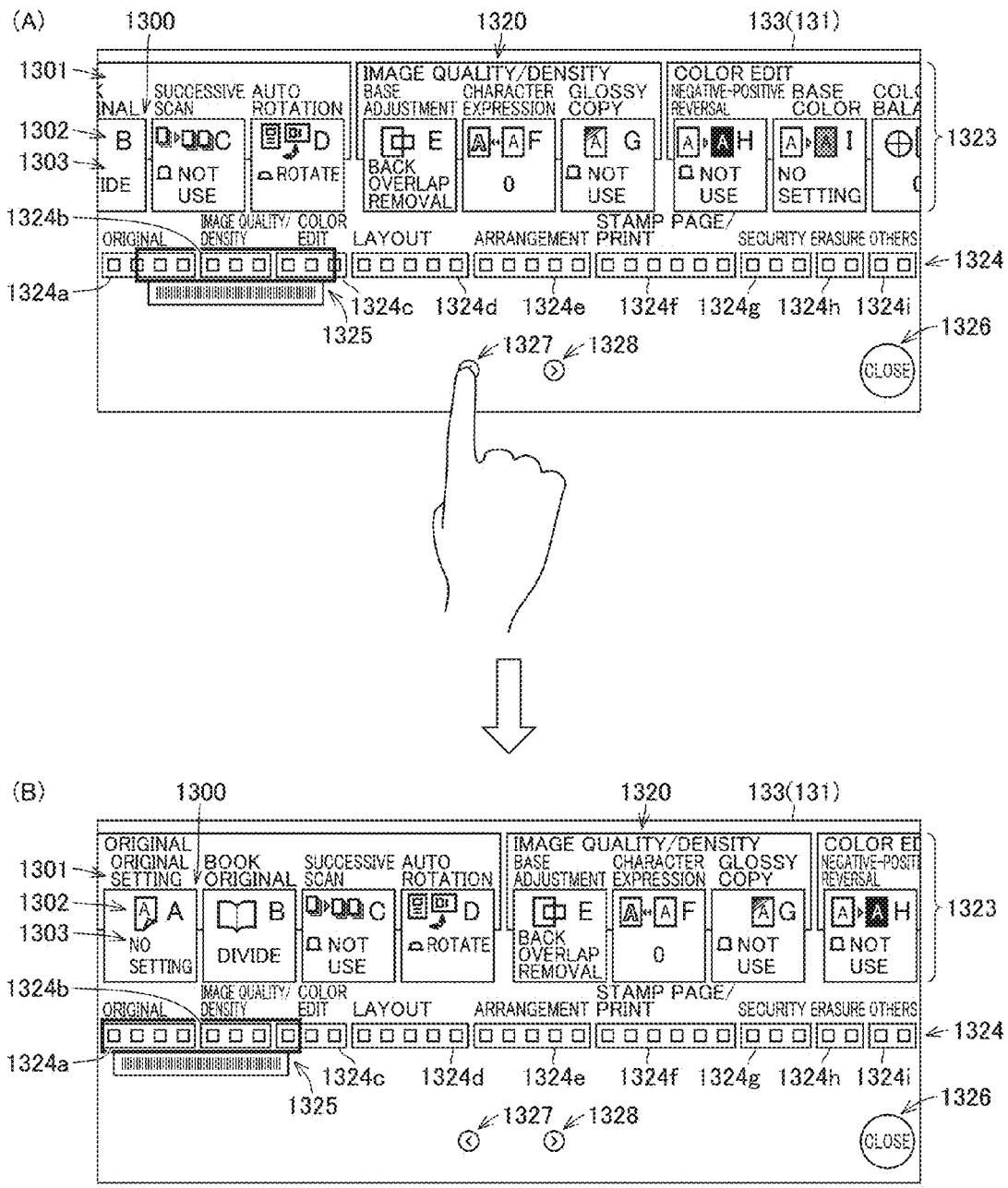
FIG. 6 is a first conceptual diagram illustrating a first scroll operation for function badges.

Slide gauge 1325 basically shifts along scroll track 1324 to specify eight markers on scroll track 1324 by enclosing them in a rectangle (excluding the case where any of the function badges are partially displayed as shown in FIG. 6). Namely, function badges 1300 corresponding to the eight markers specified by slide gauge 1325 are displayed in function badge area 1323. Here, scroll track 1324 shows each category by enclosing in a rectangle the markers corresponding to function badges 1300 constituting the category.

Accordingly, as slide gauge 1325 is shifted (hereinafter also referred to as "dragged") along scroll track 1324 while being touched (pressed), function badges 1300 corresponding to the markers specified by slide gauge 1325 are displayed one by one in function badge area 1323. Namely, the badges are scrolled to be displayed. In the following, the screen displayed on touch panel 133 as shown in FIG. 4 will also be referred to as "scroll GUI."

A "close" button 1326 is used for accepting an instruction to close this scroll GUI. A "<" button 1327 is a button for accepting an instruction to shift slide gauge 1325 leftward on the category basis. A ">" button 1328 is a button for accepting an instruction to shift slide gauge 1325 rightward on the category basis. It is noted that "<" button 1327 is also referred to as left key 1327 and ">" button 1328 is also referred to as right key 1328 in some cases.

Hardware buttons 134 include hard keys for specifying basic functions such as copy and facsimile of image processing apparatus 100. The buttons include for example a "reset" key 1322a for instructing a detail of function badge 1300 to be reset, a "scroll" key 1322b for instructing touch panel 133 to display the scroll GUI, a "copy" key 1322c for instructing the copy function to be used, and so-called ten keys 1322d. Hardware buttons 134 have only the function of accepting a user's instruction. Various hard keys included in hardware buttons 134 may also be implemented by software buttons displayed on touch panel 133.

<First Scroll Operation for Function Badges>

Figure 7:
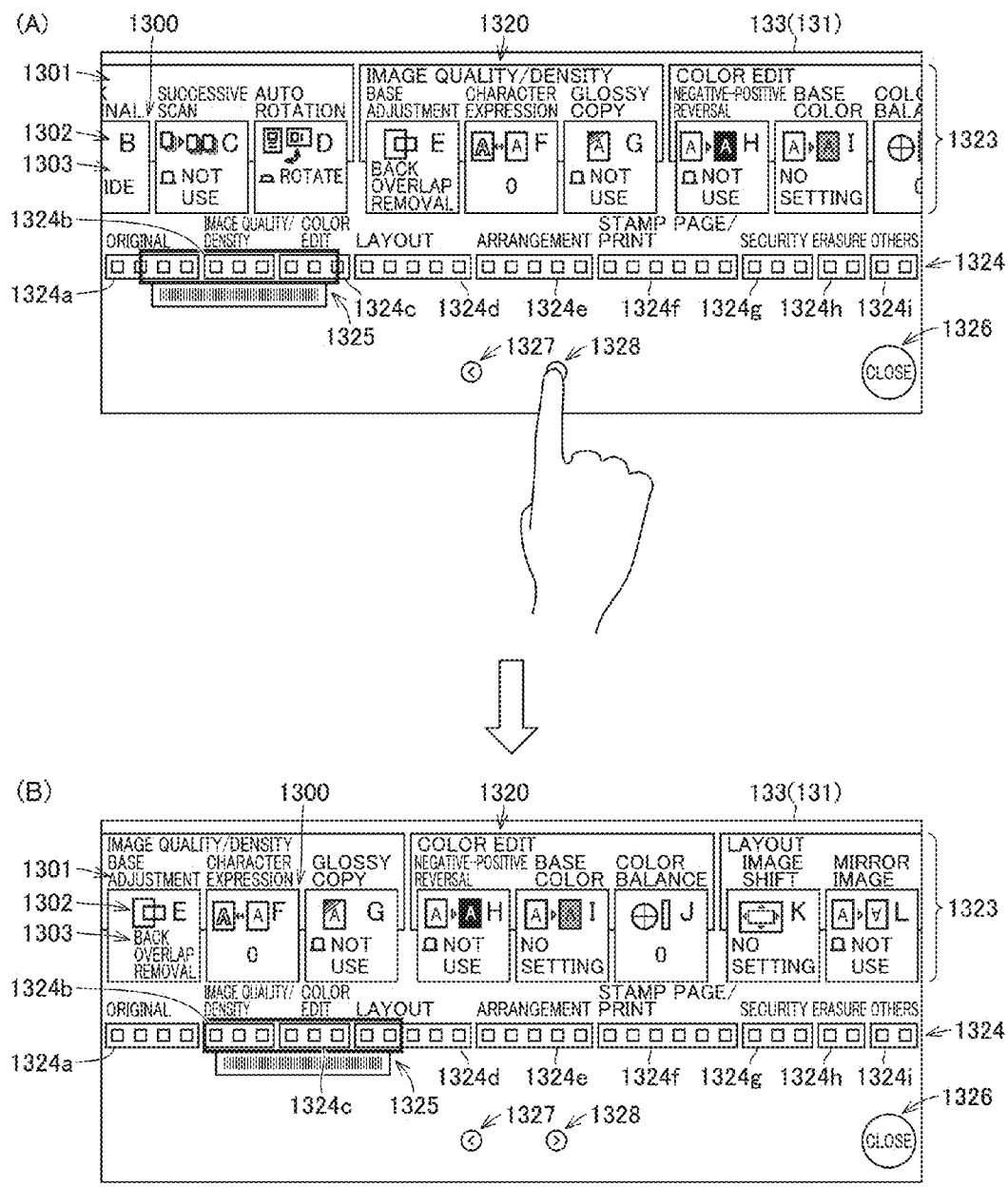
FIG. 7 is a second conceptual diagram illustrating the first scroll operation for function badges.

Next, a description will be given of a first scroll operation for the function badges according to the present embodiment. FIG. 6 is a first conceptual diagram illustrating the first scroll operation for the function badges. FIG. 7 is a second conceptual diagram illustrating the first scroll operation for the function badges. Here, the first scroll operation for the function badges is performed in response to a press of "<" button 1327 or ">" button 1328.

FIG. 6 (A) shows a state where CPU 110 causes touch panel 133 to display a part of function badge 1300B, function badge 1300C to function badge 1300I, and a part of function badge 1300J. It is supposed that a user touches "<" button 1327 of touch panel 133 in this state.

When the user touches "<" button 1327 of touch panel 133 in the state shown in FIG. 6 (A), CPU 110 causes touch panel 133 to display function badge 1300A to function badge 1300H in the manner as shown in FIG. 6 (B).

More specifically, based on the predefined relation between function badges 1300 and the categories (FIG. 5), CPU 110 identifies category 1324a to which belongs function badge 1300B displayed at the leftmost position in FIG. 6 (A). Subsequently, CPU 110 identifies the first (leftmost) function badge 1300A in identified category 1324a. CPU 110 then causes touch panel 133 to display function badge 1300A to function badge 1300H as shown in FIG. 6 (B) so that identified function badge 1300A is displayed at the leftmost position on touch panel 133.

FIG. 7 (A) also shows, in a similar manner to FIG. 6 (A), the state where CPU 110 causes touch panel 133 to display a part of function badge 1300B, function badge 1300C to function badge 1300I, and a part of function badge 1300J. It is supposed that a user touches ">" button 1328 of touch panel 133 in this state.

When the user touches ">" button 1328 of touch panel 133 in the state shown in FIG. 7 (A), CPU 110 causes touch panel 133 to display function badge 1300E to function badge 1300L.

More specifically, CPU 110 identifies, based on the predefined relation between function badges 1300 and the categories (FIG. 5), category 1324a to which belongs function badge 1300B displayed at the leftmost position in FIG. 7 (A). Subsequently, CPU 110 identifies the right-adjacent category, namely category 1324b which is adjacent on the right to identified category 1324a. CPU 110 further identifies the first (leftmost) function badge 1300E in identified category 1324b. CPU 110 then causes touch panel 133 to display function badge 1300E to function badge 1300L as shown in FIG. 7 (B) so that identified function badge 1300E is displayed at the leftmost position on touch panel 133.

Figure 8:
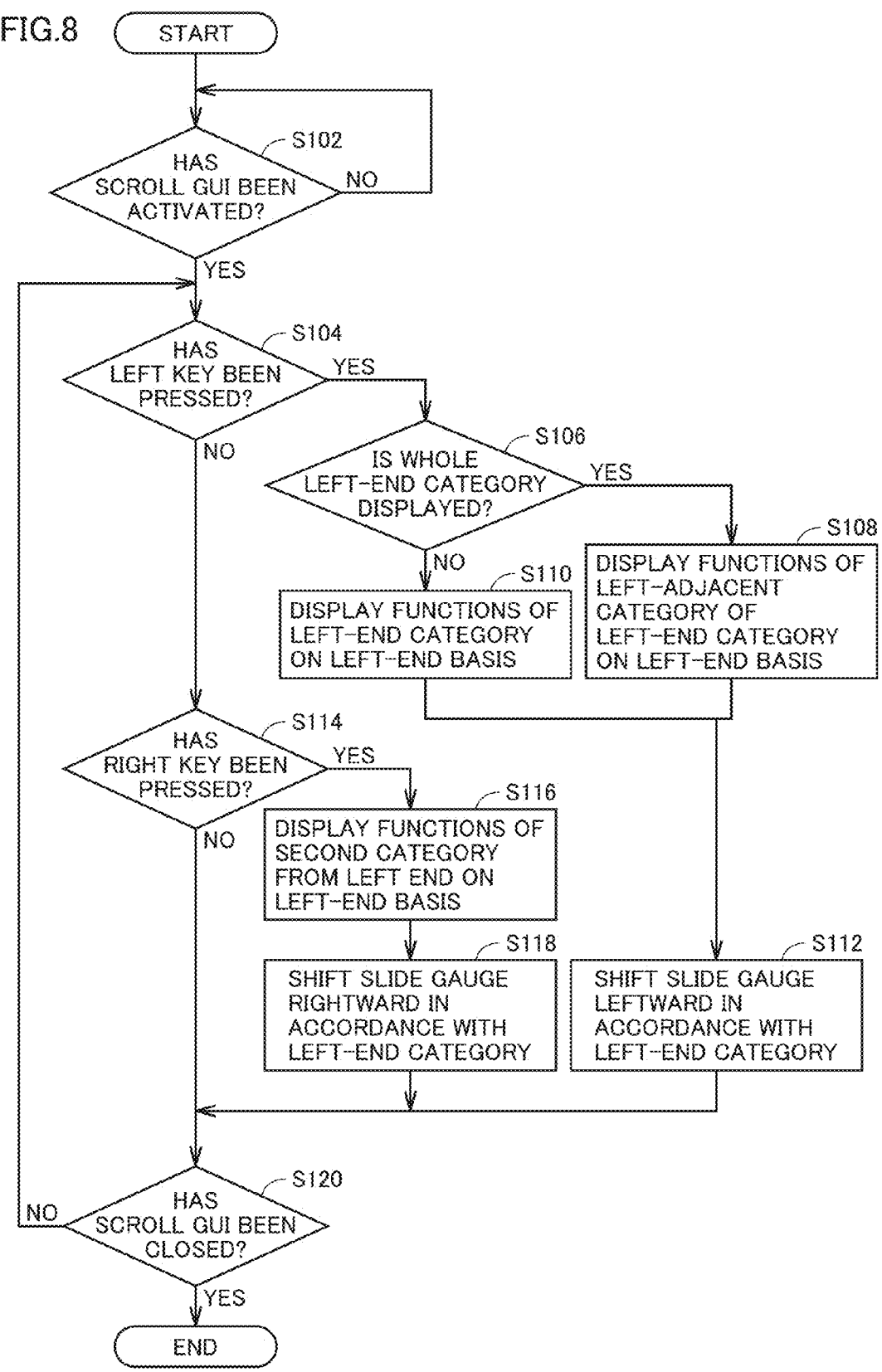
FIG. 8 is a flowchart illustrating the first scroll operation for function badges in image processing apparatus 100 according to the present embodiment.

A description will now be given of an operational procedure of the first scroll operation for the function badges in image processing apparatus 100 according to the present embodiment. FIG. 8 is a flowchart illustrating the first scroll operation for the function badges in image processing apparatus 100 according to the present embodiment.

Referring to FIG. 8, CPU 110 first determines whether or not the scroll GUI has been activated (step S102). Specifically, it is determined whether or not a user has pressed "scroll" key 1322b. When the scroll GUI has not been activated, namely the user has not pressed "scroll" key 1322b (NO in step S102), CPU 110 returns to step S102 and waits until the scroll GUI is activated.

When the scroll GUI has been activated, namely the user has pressed "scroll" key 1322b (YES in step S102), CPU 110 determines whether or not "<" button 1327 has been pressed through touch panel 133 (step S104). When "<" button 1327 has been pressed (YES in step S104), CPU 110 identifies the category to which belongs function badge 1300 displayed at the left end in function badge area 1323 (hereinafter also referred to as "left-end category"), and determines whether or not all function badges 1300 belonging to the left-end category are displayed in function badge area 1323 (step S106).

When all function badges 1300 belonging to the left-end category are displayed (YES in step S106), CPU 110 identifies the category located on the left of the left-end category (the former category will also be referred to as "left-adjacent category" hereinafter), and causes the left-adjacent category to be displayed on the left-end basis in function badge area 1323 (step S108). More specifically, CPU 110 causes all function badges belonging to the left-adjacent category to be displayed in function badge area 1323. In other words, CPU 110 causes function badge area 1323 to re-display function badges in such a manner that the first (leftmost) function badge of the function badges belonging to the left-adjacent category is displayed at the leftmost position in function badge area 1323. CPU 110 causes the slide gauge to shift leftward in accordance with the state of display of the function badges (step S112), and proceeds to step S120.

In contrast, when all function badges 1300 of the left-end category are not displayed (NO in step S106), CPU 110 causes the left-end category to be displayed on the left-end basis in function badge area 1323 (step S110). More specifically, CPU 110 causes all function badges belonging to the left-end category to be displayed in function badge area 1323. In other words, CPU 110 causes function badge area 1323 to re-display function badges in such a manner that the first (leftmost) function badge of the function badges belonging to the left-end category is displayed at the leftmost position on touch panel 133. CPU 110 causes the slide gauge to shift leftward in accordance with the state of display (step S112), and proceeds to step S120.

When "<" button 1327 has not been pressed (NO in step S104), CPU 110 determines whether or not ">" button 1328 has been pressed through touch panel 133 (step S114). When ">" button 1328 has been pressed (YES in step S114), CPU 110 identifies the category (left-end category) to which belongs function badge 1300 displayed at the left end in function badge area 1323, and then identifies the category located on the right of the left-end category (the former category will also be referred to as "right-adjacent category" hereinafter) and causes the right-adjacent category to be displayed on the left-end basis (step S116).

More specifically, CPU 110 causes all function badges belonging to the right-adjacent category to be displayed in function badge area 1323. In other words, CPU 110 causes function badge area 1323 to re-display function badges in such a manner that the first (leftmost) function badge of the function badges belonging to the right-adjacent category is displayed at the leftmost position in function badge area 1323. CPU 110 causes the slide gauge to shift rightward in accordance with the state of display (step S118), and then proceeds to step S120.

When none of "<" button 1327 and ">" button 1328 has been pressed (NO in step S114), CPU 110 proceeds to step S120 without re-displaying function badges.

In step S120, it is determined whether or not the scroll GUI has been closed (step S120). Specifically, it is determined whether or not a user has pressed "close" button 1326. When the scroll GUI has not been closed, namely the user has not pressed "close" button 1326 (NO in step S120), CPU 110 returns to step S104.

In contrast, when the scroll GUI has been closed, namely the user has pressed "close" button 1326 (YES in step S120), CPU 110 ends the first scroll operation for the function badges.

CPU 110 repeatedly performs the operation from step S104 to step S120 until the scroll GUI is closed, namely the user presses "close" button 1326.

The first scroll operation is thus performed in such a manner that, when "<" button 1327 is pressed, CPU 110 causes the left-end category to which belongs function badge 1300 displayed at the left end in function badge area 1323, or the left-adjacent category located adjacent on the left to the left-end category, to be displayed on the left-end basis. In contrast, when ">" button 1328 is pressed, CPU 110 causes the right-adjacent category adjacent on the right to the left-end category, to be displayed in function badge area 1323 on the left-end basis.

Consequently, as many function badges as possible that belong to the category of user's interest can be presented to the user. Accordingly, the possibility can be reduced that the user forgets the most preferable function badge and erroneously selects another function badge.

More specifically, multiple function badges corresponding to respective functions similar to each other may belong to the same category in some cases. When only a part of the multiple function badges is displayed, the function badge which is most preferable for the user may not be displayed. In this case, the user may be unaware of the presence of the most preferable function badge.

Regarding the first scroll operation, when "<" button 1327 or ">" button 1328 is pressed, CPU 110 causes the leftmost function badge of multiple function badges belonging to a category, to be displayed at the left end in function badge area 1323, so that more of multiple function badges belonging to the category are displayed. Consequently, the possibility is reduced that a user is unaware of the presence of the function badge which is most preferable for the user.

<Second Scroll Operation for Function Badges>

Next, a second scroll operation for the function badges according to the present embodiment will be described. FIG. 9 is a first conceptual diagram illustrating the second scroll operation for the function badges. FIG. 10 is a second conceptual diagram illustrating the second scroll operation for the function badges. Here, the second scroll operation for the function badges is performed in response to a touch on scroll track 1324.

FIG. 9 (A) shows a state where CPU 110 causes function badge area 1323 to display a part of function badge 1300B, function badge 1300C to function badge 1300I, and a part of function badge 1300J. It is supposed that a user touches the top of scroll track 1324 of touch panel 133 in this state. Here, it is supposed that the user touches a position located on the left relative to slide gauge 1325 on scroll track 1324.

Referring to FIG. 9 (B), CPU 110 causes function badge area 1323 to display function badge 1300A to function badge 1300H.

More specifically, based on the predefined relation between function badges 1300 and the categories (FIG. 5), CPU 110 identifies category 1324a to which belongs the function badge corresponding to the touched position on scroll track 1324. The function badge corresponding to the touched position on scroll track 1324 refers to the function badge corresponding to the marker on scroll track 1324 that is touched by the user.

Subsequently, CPU 110 identifies the first function badge 1300A (which should be located at the leftmost position) in identified category 1324a. CPU 110 causes function badge 1300A to function badge 1300H to be displayed in function badge area 1323 as shown in FIG. 9 (B), so that identified function badge 1300A is displayed at the leftmost position in function badge area 1323.

FIG. 10 (A) also shows, in a similar manner to FIG. 9 (A), the state where CPU 110 causes function badge area 1323 to display a part of function badge 1300B, function badge 1300C to function badge 1300I, and a part of function badge 1300J. It is supposed that a user touches the top of scroll track 1324 of touch panel 133. Here, it is supposed that the user touches a position on the right relative to slide gauge 1325 on scroll track 1324.

Referring to FIG. 10 (B), CPU 110 causes function badge area 1323 to display function badge 1300K to function badge 1300R.

More specifically, based on the predefined relation between function badges 1300 and the categories (FIG. 5), CPU 110 identifies category 1324d to which belongs the function badge corresponding to the touched position on scroll track 1324. Subsequently, CPU 110 identifies the first function badge 1300K (which should be located at the leftmost position) in identified category 1324d. CPU 110 causes function badge area 1323 to display function badge 1300K to function badge 1300R as shown in FIG. 10 (B), so that identified function badge 1300K is displayed at the leftmost position in function badge area 1323.

Figure 11:
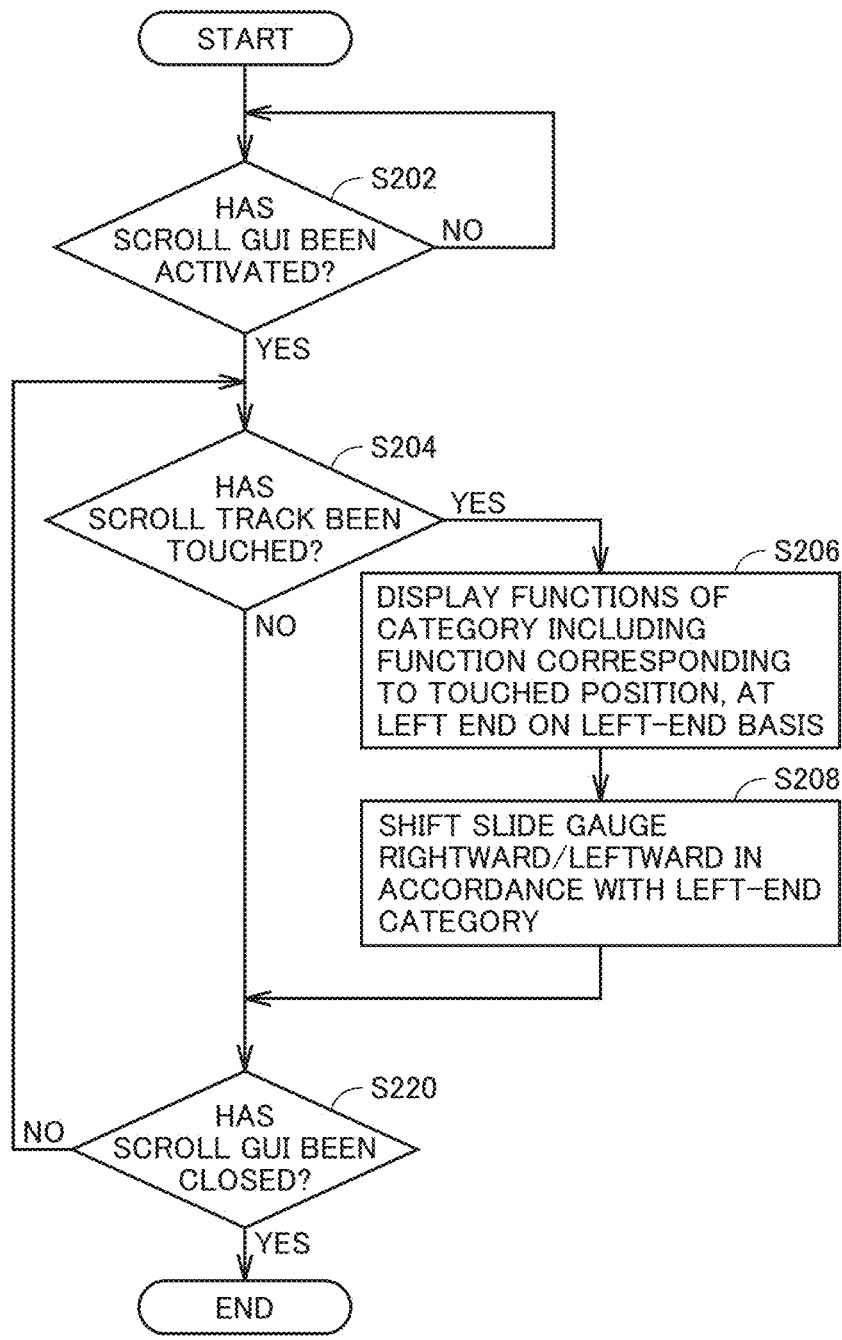
FIG. 11 is a flowchart illustrating the second scroll operation for function badges in image processing apparatus 100 according to the present embodiment.

A description will now be given of an operational procedure of the second scroll operation for the function badges in image processing apparatus 100 according to the present embodiment. FIG. 11 is a flowchart illustrating the second scroll operation for the function badges in image processing apparatus 100 according to the present embodiment.

Referring to FIG. 11, CPU 110 first determines whether or not the scroll GUI has been activated (step S202). Specifically, it is determined whether or not a user has pressed "scroll" key 1322b. When the scroll GUI has not been activated, namely the user has not pressed "scroll" key 1322b (NO in step S202), CPU 110 returns to step S202 and waits until the scroll GUI is activated.

When the scroll GUI has been activated, namely the user has pressed "scroll" key 1322b (YES in step S202), CPU 110 determines whether or not the user has touched the top of scroll track 1324 through touch panel 133 (step S204). When the user has touched the top of scroll track 1324 (YES in step S204), the category to which belongs function badge 1300 corresponding to the touched position (the category may also be referred to as "selected category" hereinafter) is displayed in function badge area 1323 on the left-end basis (step S206).

More specifically, CPU 110 causes function badge area 1323 to display all of the function badges belonging to the selected category. In other words, CPU 110 causes function badges to be re-displayed in such a manner that the first (leftmost) function badge of the function badges belonging to the selected category is displayed at the leftmost position in function badge area 1323. CPU 110 causes the slide gauge to be shifted leftward or rightward in accordance with the state of display of the function badges (step S208), and proceeds to step S220.

When the user has not touched the top of scroll track 1324 (NO in step S204), CPU 110 determines whether or not the scroll GUI has been closed (step S220). Specifically, it is determined whether or not a user has pressed "close" button 1326. When the scroll GUI has not been closed, namely the user has not pressed "close" button 1326 (NO in step S220), CPU 110 returns to step S204.

In contrast, when the scroll GUI has been closed, namely the user has pressed "close" button 1326 (YES in step S220), CPU 110 ends the second scroll operation for the function badges.

CPU 110 repeatedly performs the operation from step S204 to step S220 until the scroll GUI is closed, namely the user presses "close" button 1326.

Regarding the second scroll operation, when the user touches the top of scroll track 1324, CPU 110 causes the selected category to which belongs function badge 1300 corresponding to the touched position, to be displayed on the left-end basis.

Consequently, as many function badges as possible that belong to the category of user's interest can be presented to the user. Accordingly, the possibility can be reduced that the user forgets the most preferable function badge and erroneously selects another function badge.

More specifically, multiple function badges corresponding to respective functions similar to each other may belong to the same category in some cases. When only a part of the multiple function badges is displayed, the function badge which is most preferable for the user may not be displayed. In this case, the user may be unaware of the presence of the most preferable function badge.

Regarding the second scroll operation, when a user touches the top of scroll track 1324, CPU 110 causes the left-end function badge of multiple function badges belonging to the category corresponding to the touched position, to be displayed at the left end in function badge area 1323, so that more of multiple function badges belonging to the category are displayed. Consequently, the possibility is reduced that a user is unaware of the presence of the function badge which is most preferable for the user.

<Variation of Second Scroll Operation for Function Badges>

The following operation may also be applied to image processing apparatus 100, as a variation of the second scroll operation for the function badges.

In the state where the screen of FIG. 9 (A) is displayed, when a user touches a position on the left relative to slide gauge 1325, CPU 110 identifies category 1324*a* (left-end category) to which belongs function badge 1300B displayed at the leftmost position in function badge area 1323, and causes function badges to be re-displayed in such a manner that the first (leftmost) function badge of the function badges belonging to the left-end category is displayed at the leftmost position in function badge area 1323.

Further, in the state where the screen of FIG. 10 (A) is displayed, when a user touches a position on the right relative to slide gauge 1325, CPU 110 identifies the category (right-adjacent category) located on the right of the left-end category, and causes function badges to be re-displayed in such a manner that the first (leftmost) function badge of the function badges belonging to the right-adjacent category is displayed at the leftmost position in function badge area 1323.

In the state where the screen of FIG. 9 (A) is displayed, when a user touches a position on the left relative to slide gauge 1325, CPU 110 identifies the left-end category based on the relation between function badges 1300 and the categories shown in FIG. 5, and identifies the first function badge 1300A (which should be located at the leftmost position) in this left-end category 1324*a*. CPU 110 causes function badge area 1323 to display function badge 1300A to function badge 1300H as shown in FIG. 6 (B), so that identified function badge 1300A is displayed at the leftmost position in function badge area 1323.

In contrast, in the state where the screen of FIG. 10 (A) is displayed, when a user touches a position on the right relative to slide gauge 1325, CPU 110 identifies category 1324*b* as the right-adjacent category based on the relation between function badges 1300 and the categories shown in FIG. 5. CPU 110 then causes function badge 1300E to function badge 1300L to be displayed (FIG. 7 (B)), so that the first (leftmost) function badge 1300E in right-adjacent category 1324*b* is displayed at the leftmost position on touch panel 133.

Figure 12:
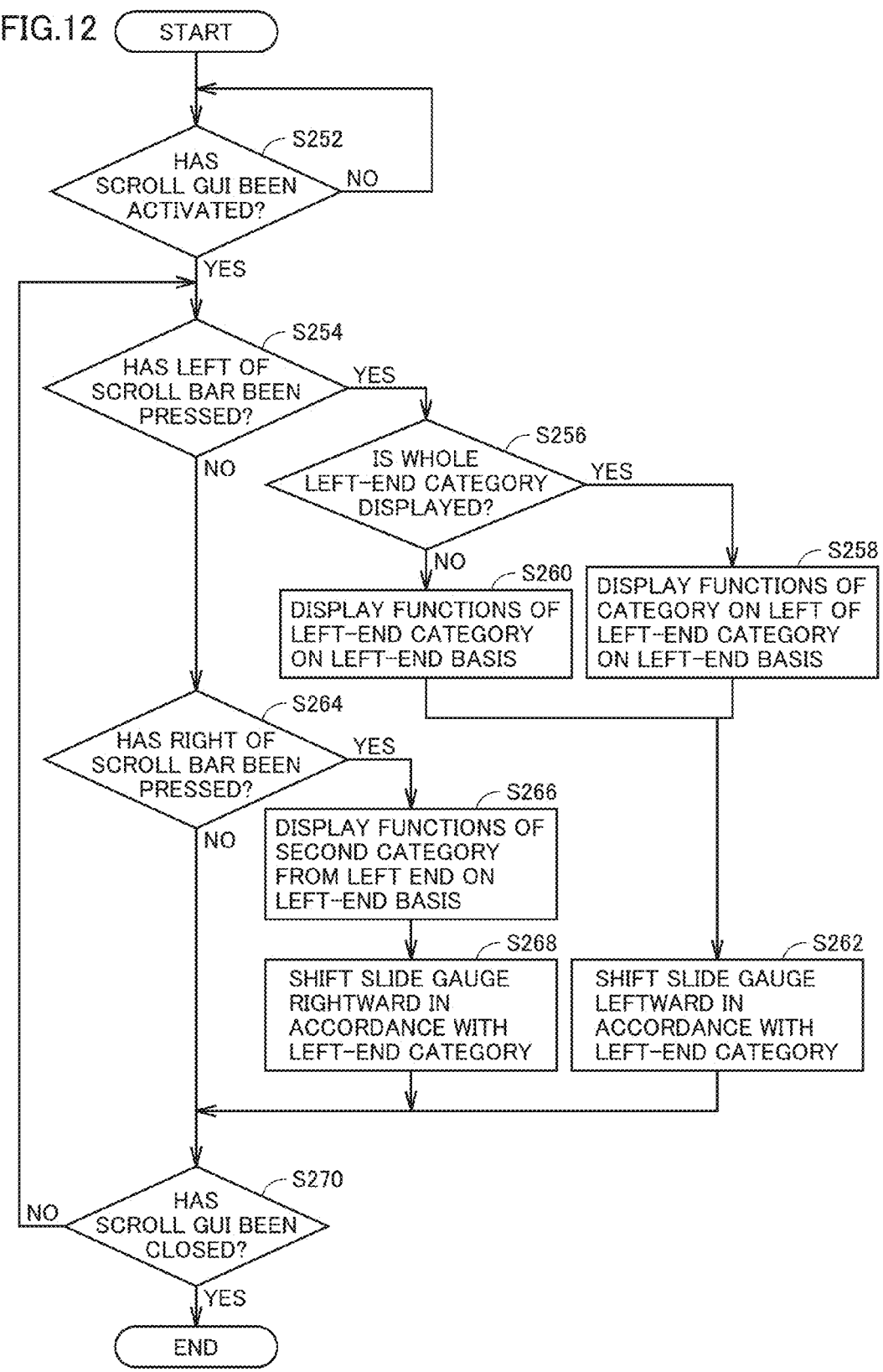
FIG. 12 is a flowchart illustrating the second scroll operation for function badges in image processing apparatus 100 according to a variation.

Next, a description will be given of an operational procedure of the second scroll operation for the function badges in image processing apparatus 100 according to the present variation. FIG. 12 is a flowchart illustrating the second scroll operation for the function badges in image processing apparatus 100 according to the present variation.

Referring to FIG. 12, CPU 110 first determines whether or not the scroll GUI has been activated (step S252). Specifically, it is determined whether or not a user has pressed "scroll" key 1322*b*. When the scroll GUI has not been activated, namely the user has not pressed "scroll" key 1322*b* (NO in step S252), CPU 110 returns to step S252 and waits until the scroll GUI is activated.

When the scroll GUI has been activated, namely the user has pressed "scroll" key 1322*b* (YES in step S252), CPU 110 determines whether or not the user has touched a left position relative to slide gauge 1325 on scroll track 1324 through touch panel 133 (step S254). When the user has touched a left position relative to slide gauge 1325 on scroll track 1324 (YES in step S254), it is determined whether or not all function badges 1300 are displayed that are of the category (left-end category) to which belongs function badge 1300 which is displayed at the left end in function badge area 1323 (step S256).

When all function badges 1300 of this category are displayed (YES in step S256), CPU 110 causes the category (left-adjacent category) located on the left of the left-end category to be displayed on the left-end basis in function badge area 1323 (step S258). More specifically, CPU 110 causes function badge area 1323 to display all function badges belonging to the left-adjacent category. In other words, CPU 110 causes function badges to be re-displayed in such a manner that the first function badge (which should be displayed at the leftmost position) of the function badges belonging to the left-adjacent category is displayed at the leftmost position on touch panel 133. CPU 110 causes the slide gauge to shift leftward in accordance with the state of display of the function badges (step S262). CPU 110 then performs the operation from step S270.

When all function badges 1300 of the left-end category are not displayed (NO in step S256), CPU 110 causes function badge area 1323 to display the left-end category on the left-end basis (step S260). More specifically, CPU 110 causes function badge area 1323 to display all function badges belonging to the left-end category. In other words, CPU 110 causes function badge area 1323 to re-display function badges in such a manner that the first (leftmost) function badge of the function badges belonging to the left-end category is displayed at the leftmost position on touch panel 133. CPU 110 causes the slide gauge to shift leftward in accordance with the state of display (step S262), and proceeds to step S270.

When the user has not touched a left position relative to slide gauge 1325 on scroll track 1324 (NO in step S254), CPU 110 determines whether or not the user has touched a right position relative to slide gauge 1325 on scroll track 1324 through touch panel 133 (step S264). When the user has touched a right position relative to slide gauge 1325 on scroll track 1324 (YES in step S264), CPU 110 causes the category (right-adjacent category) which should be located on the right of the left-end category, to be displayed on the left-end basis in function badge area 1323 (step S266).

More specifically, CPU 110 causes function badge area 1323 to display all function badges belonging to the right-adjacent category. In other words, CPU 110 causes function badge area 1323 to re-display function badges in such a manner that the first (leftmost) function badge of the function badges belonging to the right-adjacent category is displayed at the leftmost position in function badge area 1323. CPU 110 causes the slide gauge to shift rightward in accordance with the state of display, and proceeds to step S270.

When the user has not touched a left or right position relative to slide gauge 1325 on scroll track 1324 (NO in step S264), CPU 110 determines whether or not the scroll GUI has been closed (step S270). When the scroll GUI has not been closed, namely the user has not pressed "close" button 1326 (NO in step S270), CPU 110 returns to step S254.

In contrast, when the scroll GUI has been closed, namely the user has pressed "close" button 1326 (YES in step S270), CPU 110 ends the second scroll operation for the function badges.

CPU 110 repeatedly performs the operation from step S254 to step S270 until the scroll GUI is closed, namely the user presses "close" button 1326.

Thus, regarding the present variation, when the user touches a left position relative to slide gauge 1325 on scroll track 1324, CPU 110 causes the left-end category to which belongs function badge 1300 displayed at the left end in function badge area 1323, or the left-adjacent category adjacent on the left to the left-end category, to be displayed on the left-end basis. When the user touches a right position relative to slide gauge 1325 on scroll track 1324, CPU 110 causes the right-adjacent category adjacent on the right to the left-end category to be displayed on the left-end basis.

Consequently, as many function badges as possible that belong to the category of user's interest can be presented to the user. Accordingly, the possibility can be reduced that the user forgets the most preferable function badge and erroneously selects another function badge.

More specifically, multiple function badges corresponding to respective functions similar to each other may belong to the same category in some cases. When only a part of the multiple function badges is displayed, the function badge which is most preferable for the user may not be displayed. In this case, the user may be unaware of the presence of the most preferable function badge.

Regarding the present variation, when a user touches the top of scroll track 1324, CPU 110 causes the left-end function badge of multiple function badges belonging to the left-adjacent or right-adjacent category of the current left-end category, to be displayed at the left end in function badge area 1323, depending on the touched position relative to slide gauge 1325. Therefore, more of multiple function badges belonging to the category are displayed. Consequently, the possibility is reduced that a user is unaware of the presence of the function badge which is most preferable for the user.

<Third Scroll Operation for Function Badges>

A description will next be given of a third scroll operation for the function badges according to the present embodiment. FIG. 13 is a first conceptual diagram illustrating the third scroll operation for the function badges. FIG. 14 is a second conceptual diagram illustrating the third scroll operation for the function badges. The third scroll operation for the function badges is carried out here in response to a touch on a function badge.

FIG. 13 (A) shows a state where CPU 110 causes function badge area 1323 to display a part of function badge 1300B, function badge 1300C to function badge 1300I, and a part of function badge 1300J. It is supposed that a user touches function badge 1300D of touch panel 133 in this state.

Referring to FIG. 13 (B), CPU 110 causes function badge area 1323 to display function badge 1300A to function badge 1300H.

More specifically, based on the predefined relation between function badges 1300 and the categories (FIG. 5), CPU 110 identifies category 1324*a* to which the touched function badge belongs. Subsequently, CPU 110 identifies the first function badge 1300A (which should be located at the leftmost position) in identified category 1324*a*. CPU 110 then causes function badge area 1323 to display function badge 1300A to function badge 1300H as shown in FIG. 13 (B) so that identified function badge 1300A is displayed at the leftmost position in function badge area 1323.

FIG. 14 (A) also shows, in a similar manner to FIG. 13 (A), the state where CPU 110 causes function badge area 1323 to display a part of function badge 1300B, function badge 1300C to function badge 1300I, and a part of function badge 1300J. It is supposed that a user touches function badge 1300I of touch panel 133 in this state.

Referring to FIG. 14 (B), CPU 110 causes function badge area 1323 to display function badge 1300H to function badge 1300O.

More specifically, CPU 110 identifies, based on the relation between function badges 1300 and category 1324*c* shown in FIG. 5, category 1324*c* to which touched function badge 1300I belongs. Subsequently, CPU 110 identifies the first function badge 1300H (which should be located at the leftmost position) in identified category 1324*c*. CPU 110 then causes function badge area 1323 to display function badge 1300H to function badge 1300O as shown in FIG. 14 (B) so that identified function badge 1300H is displayed at the leftmost position on touch panel 133.

A description will now be given of an operational procedure of the third scroll operation for the function badges in image processing apparatus 100 according to the present embodiment. FIG. 15 is a flowchart illustrating the third scroll operation for the function badges in image processing apparatus 100 according to the present embodiment.

Referring to FIG. 15, CPU 110 first determines whether or not the scroll GUI has been activated (step S302). Specifically, it is determined whether or not a user has pressed "scroll" key 1322*b*. When the scroll GUI has not been activated, namely the user has not pressed "scroll" key 1322*b* (NO in step S302), CPU 110 returns to step S302 and waits until the scroll GUI is activated.

When the scroll GUI has been activated, namely the user has pressed "scroll" key 1322*b* (YES in step S302), CPU 110 determines whether or not the user has touched any of function badges 1300 through touch panel 133 (step S304). When the user has touched any of function badges 1300 (YES in step S304), CPU 110 causes function badge area 1323 to display, on the left-end basis, the category (hereinafter also referred to as "selected category") to which this function badge 1300 belongs (step S306).

More specifically, CPU 110 causes function badge area 1323 to display all of the function badges belonging to the selected category. In other words, CPU 110 causes function badges to be re-displayed in such a manner that the first (leftmost) function badge of the function badges belonging to the selected category is displayed at the leftmost position in function badge area 1323. CPU 110 shifts the slide gauge leftward or rightward in accordance with the state of display of the function badges (step S308), and proceeds to step S320.

In contrast, when the user has not touched function badge 1300 (NO in step S304), CPU 110 proceeds to step S320 without re-displaying function badges.

In step S320, CPU 110 determines whether or not the scroll GUI has been closed. Specifically, it is determined whether or not a user has pressed "close" button 1326. When the scroll GUI has not been closed, namely the user has not pressed "close" button 1326 (NO in step S320), CPU 110 returns to step S304. When the scroll GUI has been closed, namely the user has pressed "close" button 1326 (YES in step S320), CPU 110 ends the third scroll operation for the function badges.

CPU 110 repeatedly performs the operation from step S304 to step S320 until the scroll GUI is closed, namely the user presses "close" button 1326.

Thus, regarding the third scroll operation, when the user touches function badge 1300 of touch panel 133, CPU 110 causes the category (selected category), to which the touched function badge 1300 belongs, to be displayed on the left-end basis.

Consequently, as many function badges as possible that belong to the category of user's interest can be presented to the user. Accordingly, the possibility can be reduced that the user forgets the most preferable function badge and erroneously selects another function badge.

More specifically, multiple function badges corresponding to respective functions similar to each other may belong to the same category in some cases. When only a part of the multiple function badges is displayed, the function badge which is most preferable for the user may not be displayed. In this case, the user may be unaware of the presence of the most preferable function badge.

Regarding the third scroll operation, when a user touches the top of function badge 1300, CPU 110 causes the left-end function badge of multiple function badges belonging to the category to which the touched function badge 1300 belongs, to be displayed at the left end in function badge area 1323, so that more of multiple function badges belonging to the category are displayed. Consequently, the possibility is reduced that a user is unaware of the presence of the function badge which is most preferable for the user.

<Other Embodiments>

In the above-described embodiment, image processing apparatus 100 re-displays function badges (objects) 1300 on the left-end basis in response to a user's operation. Image processing apparatus 100, however, may also re-display function badges 1300 on the right-end basis in response to a user's operation.

Further, while the above-described embodiment allows image processing apparatus 100 to arrange function badges 1300 in the lateral direction, image processing apparatus 100 may arrange function badges 1300 in the vertical direction. In this case, image processing apparatus 100 may re-display function badges 1300 on the top-end basis in response to a user's operation, or re-display function badges 1300 on the bottom-end basis.

It will be evident that the present invention is also applicable to the case where the present invention is achieved by supplying a program to an image processing apparatus. Then, the effect of the present invention can also be enjoyed by supply of a storage medium storing a program represented by software for achieving the present invention to a system or an apparatus and reading and execution of program codes stored in the storage medium by a computer (or a CPU or an MPU) of the system or the apparatus.

In this case, the program codes themselves read from the storage medium realize the functions in the above-described embodiment, and the storage medium storing the program codes constitutes the present invention.

Further, a computer may read and execute program codes to thereby implement the functions of the above-described embodiment, or an OS (Operating System) for example operating on the computer may perform a part or the whole of actual processing based on instructions of the program codes to thereby implement the functions of the above-described embodiment through the processing. Evidently this is also encompassed herein.

Furthermore, program codes read from a storage medium may be written in a memory of a feature expansion board inserted in a computer or a feature expansion unit connected to a computer, and thereafter a CPU for example of the feature expansion board or the feature expansion unit may perform a part or the whole of actual processing based on instructions of the program codes to thereby implement the functions of the above-described embodiment through the processing. Evidently, this is encompassed herein as well.

Examples of the storage medium include media storing a program in a non-volatile manner, such as a CD-ROM (Compact Disc-Read Only Memory), a DVD-ROM (Digital Versatile Disk-Read Only Memory), a USB (Universal Serial Bus) memory, a memory card, an FD (Flexible Disk), a hard disk, a magnetic tape, a cassette tape, an MO (Magnetic Optical Disc), an MD (Mini Disc), an IC (Integrated Circuit) card (except for memory cards), an optical card, a mask ROM, an EPROM, an EEPROM (Electronically Erasable Programmable Read-Only Memory), and the like.

<Overview>

As heretofore described, according to the present embodiment, an image processing apparatus is provided that includes: a display; a memory storing a plurality of functions in such a manner that associates the functions each with one of a plurality of categories; and a controller for causing the display to array and display objects representing respective functions that are a part of the plurality of functions, so that the objects are arrayed category by category and the objects can be scrolled in a direction in which the objects are arrayed. In response to a command to change the displayed objects, the controller refers to the memory to change the displayed objects on category basis.

Preferably, the controller accepts a first command for specifying a first direction parallel to the direction in which the objects are arrayed, and a second command for specifying a second direction opposite to the first direction. In response to the first command, the controller causes the display to shift the objects in the second direction on category basis. In response to the second command, the controller causes the display to shift the objects in the first direction on category basis.

Preferably, the controller causes the display to display a scroll bar for changing the displayed objects, the controller accepts a third command for specifying a position on the scroll bar, and based on the object corresponding to the position specified by the third command, the controller causes the display to shift the objects on category basis, so that objects belonging to a category to which belongs a function corresponding to the object are displayed in order from an end of the display.

Preferably, the controller accepts a fourth command for selecting the object being displayed, and based on the object specified by the fourth command, the controller causes the display to shift the objects on category basis, so that objects belonging to a category to which belongs a function corresponding to the object are displayed in order from an end of the display.

Preferably, the controller causes the display to array and display the objects in a lateral direction, the controller accepts a command for specifying a leftward direction as a first command, and accepts a command for specifying a rightward direction as a second command. In response to the first command, the controller causes the display to array and display objects representing respective functions that are a part of the plurality of functions, so that a leftmost object in a category to which belongs an object that is displayed at a leftmost position at the time when the first command is accepted, is displayed at a leftmost position, and in response to the second command, the controller causes the display to display the objects, so that a leftmost object in a category that is right-adjacent to a category to which belongs an object that is displayed at a leftmost position at the time when the second command is accepted, is displayed at a leftmost position.

Preferably, the controller causes the display to display a scroll bar for changing the displayed objects, the controller accepts a third command for specifying a position on the scroll bar, and based on the object corresponding to the position specified by the third command, the controller causes the display to display the objects, so that a leftmost object in a category to which a function corresponding to the object belongs is displayed at a leftmost position.

Preferably, the controller accepts a fourth command for selecting the object being displayed, and based on the object specified by the fourth command, the controller causes the display to display the objects, so that a leftmost object in a category to which a function corresponding to the object belongs is displayed at a leftmost position.

Further, according to the present embodiment, a display method of an image processing apparatus is provided that includes a display and a memory storing a plurality of functions in such a manner that associates the functions each with one of a plurality of categories. The display method includes the steps of: causing the display to array and display objects representing respective functions that are a part of the plurality of functions; and in response to a command to change the displayed objects, referring to the memory to change the displayed objects on category basis.

Furthermore, according to the present embodiment, a computer-readable storage medium storing a display program for an image processing apparatus is provided that includes a memory storing a plurality of functions in such a manner that associates the functions each with one of a plurality of categories, a display, and a processor. The display program causes the processor to execute the steps of: causing the display to array and display objects representing respective functions that are a part of the plurality of functions; and in response to a command to change the displayed objects, referring to the memory to change the displayed objects on category basis.

As seen from the foregoing, the present invention enables a user to easily find a desired function.

Although the present invention has been described and illustrated in detail, it is clearly understood that the same is by way of illustration and example only and is not to be taken by way of limitation, the scope of the present invention being interpreted by the terms of the appended claims.

What is claimed is:

1. A non-transitory computer-readable storage medium storing a display program for an image processing apparatus including a memory storing a plurality of functions in such a manner that associates the functions each with one of a plurality of categories, a display, and a processor, said display program causing said processor to execute the steps of:

causing said display including (i) a marker display area for displaying a list of markers which indicate functions mounted on said image processing apparatus, and (ii) an object display area, separate and distinct from said marker display area, for displaying objects, for setting functions, corresponding to a predetermined number of markers of a range specified in said marker display area, respectively, (1) to display said markers, which are grouped per category according to a kind of function, in said marker display area, and (2) to display said objects, which are grouped per same category as said markers, according to the kind of function, in said object display area; and in response to a command to change the displayed objects to be displayed on said object display area, changing the objects to be displayed on said object display area on a category basis.

2. The non-transitory computer-readable storage medium according to claim 1, wherein said step of changing the displayed objects includes the steps of:

accepting a first command for specifying a first direction parallel to the direction in which said markers are arrayed on said marker display area, and a second command for specifying a second direction opposite to said first direction, as a command for changing the object to be displayed on said object display area;

in response to said first command, causing said display to change said objects to be displayed so that said object display area displays an object corresponding to a marker displayed on said first direction side rather than displaying said predetermined number of markers of said range in said second direction, in said second direction on category basis; and in response to said second command, causing said display to change said objects to be displayed so that said object display area displays an object corresponding to a marker displayed on said second direction side rather than said predetermined number of markers of said range in said first direction on category basis.

3. The non-transitory computer readable storage medium according to claim 1, wherein said step of changing the objects includes the steps of:

accepting a first command for specifying the marker displayed on said marker display area, as a command for changing the object to be displayed on said object display area; and in response to said first command, causing said display to change the objects to be displayed on said object display area on the category basis, so that objects belonging to a category to which the object corresponding to the specified marker belongs are displayed.

4. The non-transitory computer-readable storage medium according to claim 1, wherein an order of display array in the category is matched with each said object, and wherein said step of changing the objects includes the steps of:

accepting a first command for selecting said object being displayed on said object display area, as a command for changing the object to be displayed on said object display area; and in response to said first command, causing said display to change the objects to be displayed on said object display area on the category basis, so that objects belonging to a category, to which the object corresponding to the selected object belongs, are displayed in order from the first of said array.

5. The non-transitory computer-readable storage medium according to claim 2, wherein an order of display array in the category is matched with each said marker and said object, respectively, said markers and said objects are arrayed in order and displayed on the horizontal direction in said marker display area and said object display area, respectively, said step to change the objects includes the steps of:

accepting a command for specifying a leftward direction as the first command, and accepting a command for specifying a rightward direction as the second command;

in response to said first command, causing said display to change objects to be displayed on said object display are on the category basis, so that a leftmost object in a category to which an object that is displayed at a leftmost position at the time when said first command is accepted belongs, is displayed at a leftmost position in order from the first of said order of array; and in response to said second command, causing said display to change the objects to be displayed on said object display are on the category basis, so that a leftmost object in a category that is right-adjacent to a category to which an object that is displayed at a leftmost position at the time when said second command is accepted belongs, is displayed at a leftmost position in order from the first of said order of array.

6. The non-transitory computer-readable storage medium according to claim 3, wherein
   an order of display array in the category is matched with each said marker and said object, respectively,
   said markers and said objects are arrayed in order and displayed on the horizontal direction in said marker display area and said object display area respectively,
   said step to change the objects includes the steps of:
      accepting a second command for specifying a displayed marker on said marker display area and
      in response to said second command, causing said display to change the objects to be displayed on said object display area on the category basis, so that the objects belonging to a category to which the object corresponding to the specified marker belongs are displayed at a leftmost position in order from the first of said order of array.

7. The storage medium according to claim 4, wherein
   said objects are arrayed in order and displayed on the horizontal direction in said object display area,
   said step to change the objects includes the steps of:
      accepting a second command for selecting said object being displayed on said object display area; and
      in response to said second command, causing said display to change the objects to be displayed on said object display area on the category basis, so that a objects belonging to a category to which the object corresponding to the selected object belongs are displayed at a leftmost position in order from the first of said order array.

8. The non-transitory computer-readable storage medium according to claim 1, wherein said step of changing the objects includes the steps of:
   accepting a first command for specifying a first direction parallel to the direction in which said markers are arrayed on said marker display area,
   accepting a second command for specifying a second direction opposite to said first direction, as a command for changing the object to be displayed on said object display area,
   in response to said first command, changing said objects to be displayed on said object display area so that the object corresponding to the marker displayed on said first direction side rather than said predetermined number of marker of said range, on category basis, and
   in response to said second command, changing said objects to be displayed on said object display area so that the object corresponding to the marker displayed on said second direction side rather than said predetermined number of marker of said range, on category basis.

9. The non-transitory computer-readable storage medium according to claim 8, wherein
   an order of display array in the category is matched with each said marker and said object, respectively,
   said markers and said objects are arrayed in order and displayed on the horizontal direction in said marker display area and said object display area, respectively,
   said step to change the objects includes the steps of:
      accepting a command for specifying a leftward direction as the first command;
      accepting a command for specifying a rightward direction as the second command;
      in response to said first command, causing said display to change objects to be displayed on said object display area on category basis, so that a leftmost object in a category to which an object that is displayed at a leftmost position at the time when said first command is accepted belongs, is displayed at a leftmost position in order from the first of said order of array; and
      in response to said second command, causing said display to change the objects to be displayed on said object display area on category basis, so that a leftmost object in a category that is right-adjacent to a category to which an object that is displayed at a leftmost position at the time when said second command is accepted belongs, is displayed at a leftmost position in order from the first of said order of array.

10. An image processing apparatus comprising:
   a display including (i) a marker display area for displaying a list of markers which indicate respective functions mounted on said image processing apparatus, and (ii) an object display area, separate and distinct from said marker display area, for displaying objects for setting functions, said object display area includes objects corresponding to a predetermined number of markers of a range specified in said marker display area; and
   a processor for causing said display (i) to display said markers, which are grouped per category according to a kind of function, in said marker display area, and (ii) to display said objects, which are grouped per same category as said markers according to the kind of function, in said object display area,
   wherein in response to a command to change the displayed objects to be displayed on said object display area, said processor changes the objects to be displayed on said object display area on a category basis.

11. The image processing apparatus according to claim 10, wherein
   said processor accepts (i) a first command for specifying a first direction parallel to the direction in which said markers are arrayed on said marker display area, and (ii) a second command for specifying a second direction opposite to said first direction, as a command for changing the object to be displayed on said object display area,
   in response to said first command, said processor causes said display to change said objects to be displayed so that said object display area displays an object corresponding to a marker displayed on said first direction side rather than displaying said predetermined number of markers of said range, on the category basis, and
   in response to said second command, said processor causes said display to change said objects to be displayed so that said object display area displays the object corresponding to the marker displayed on said second direction side rather than displaying said predetermined number of markers of said range, on the category basis.

12. The image processing apparatus according to claim 10, wherein
   said processor accepts a first command, as a command for changing the object to be displayed on said object display area, for specifying the marker displayed on said marker display area, and
   in response to said first command, said processor causes said display to change the objects to be displayed on said object display area on the category basis, so that objects belonging to a category to which the object corresponding to the specified marker belongs are displayed.

13. The image processing apparatus according to claim 10, wherein
   said processor accepts, from said marker display area, a first command for specifying a first direction parallel to a direction in which said markers are arrayed, and a second command for specifying a second direction opposite to said first direction, as a command for changing the object to be displayed on said object display area, in response to said first command, said processor causes said display to change said objects to be displayed so that said object display area displays the object corresponding to the marker displayed on said first direction side rather than displaying said predetermined number of markers of said range, on the category basis, and in response to said second command, said processor causes said display to change said objects to be displayed on said object display area so that the object corresponding to the marker displayed on said second direction side rather than said predetermined number of marker of said range, on category basis.

14. The image processing apparatus according to claim 10, wherein an order of display array in the category is matched with each said object, said processor accepts a first command for selecting said object being displayed on said object display area, as a command for changing the object to be displayed on said object display area, and in response to said first command, said processor causes said display to change the objects to be displayed on said object display area on the category basis, so that objects belonging to a category to which the object corresponding to the selected object belongs are displayed in order from the first of said order of array.

15. The image processing apparatus according to claim 11, wherein an order of display array in the category is matched with each said marker and said object, respectively, said markers and said objects are arrayed in order and displayed on the horizontal direction in said marker display area and said object display area, respectively, said processor accepts a command for specifying a leftward direction as the first command, and accepts a command for specifying a rightward direction as the second command, in response to said first command, said processor causes said display to change objects to be displayed on said object display area on the category basis, so that a leftmost object in a category to which an object that is displayed at a leftmost position at the time when said first command is accepted belongs, is displayed at a leftmost position in order from the first of said order of array, and in response to said second command, said processor causes said display to change the objects to be displayed on said object display area on category basis, so that a leftmost object in a category that is right-adjacent to a category to which an object that is displayed at a leftmost position at the time when said second command is accepted belongs, is displayed at a leftmost position in order from the first of said order of array.

16. The image processing apparatus according to claim 12, wherein an order of display array in the category is matched with each said marker and said object, respectively, said markers and said objects are arrayed in order and displayed on the horizontal direction in said marker display area and said object display area, respectively, said processor accepts a second command for specifying the displayed marker on said marker display area, and in response to said second command, said processor causes said display to change the objects to be displayed on said object display area on category basis, so that the objects belonging to a category to which the object corresponding to the specified marker belongs are displayed at a leftmost position in order from the first of said order of array.

17. The image processing apparatus according to claim 13, wherein the order of display array in the category is matched with each said marker and said object, respectively, said markers and said objects are arrayed in order and displayed on the horizontal direction in said marker display area and said object display area, respectively, said processor accepts a command for specifying a leftward direction as the first command, and accepts a command for specifying a rightward direction as the second command, in response to said first command, said processor causes said display to change objects to be displayed on said object display area on category basis, so that a leftmost object in a category to which an object that is displayed at a leftmost position at the time when said first command is accepted belongs, is displayed at a leftmost position in order from the first of said order of array, and in response to said second command, said processor causes said display to change the objects to be displayed on said object display area on category basis, so that a leftmost object in a category that is right-adjacent to a category to which an object that is displayed at a leftmost position at the time when said second command is accepted belongs, is displayed at a leftmost position in order from the first of said order of array.

18. The image processing apparatus according to claim 14, wherein said objects are arrayed in order and displayed on the horizontal direction in said object display area, said processor accepts a second command for selecting said object being displayed on said object display area, and in response to said second command, said processor causes said display to change the objects to be displayed on said object display area on category basis, so that objects belonging to a category to which the object corresponding to the selected object belongs are displayed at a leftmost position in order from the first of said order of array.

19. A display method of an image processing apparatus including a display and a processor, said display method comprising the steps of:

causing said display, including (i) a marker display area for displaying a list of markers which indicate functions mounted on said image processing apparatus, and (ii) an object display area, separate and distinct from said marker display area, for displaying objects, for setting functions, corresponding to a predetermined number of markers of a range specified in said marker display area, respectively, (1) to display said markers, which are grouped per category according to a kind of function, in said marker display area and (2) to display said objects, which are grouped per same category as said marker according to the kind of function, in said object display area; and in response to a command to change the displayed objects to be displayed on said object display area, changing the objects to be displayed on said object display area on a category basis.

20. The display method according to claim 19, wherein said step of changing the objects includes the steps of:

accepting a first command for specifying a first direction parallel to the direction in which said markers are arrayed on said marker display area, and a second command for specifying a second direction opposite to said first direction, as a command for changing the object to be displayed on said object display area;

in response to said first command, causing said display to change said objects to be displayed such that said object display area displays an object corresponding to a marker displayed on said first direction side rather than displaying said predetermined number of markers of said range in said second direction on category the basis; and in response to said second command, causing said display to change said objects to be displayed such that said object display area displays an object corresponding to a marker displayed on said second direction side rather than displaying said predetermined number of markers of said range in said first direction on the category basis.

21. The display method according to claim 19, said step of changing the objects includes the steps of:

accepting a first command for specifying the marker displayed on said marker display area, as a command for changing the object to be displayed on said object display area; and in response to said first command, causing said display to change the objects to be displayed on said object display area on category basis, so that objects belonging to a category to which the object corresponding to the specified marker belongs are displayed.

22. The display method according to claim 19, wherein said step of changing the objects includes the steps of:

accepting a first command for specifying a first direction parallel to the direction in which said markers are arrayed on said marker display area, accepting a second command for specifying a second direction opposite to said first direction, as a command for changing the object to be displayed on said object display area, in response to said first command, changing said objects to be displayed on said object display area so that the object corresponding to the marker displayed on said first direction side rather than said predetermined number of marker of said range, on category basis, and in response to said second command, changing said objects to be displayed on said object display area so that the object corresponding to the marker displayed on said second direction side rather than said predetermined number of marker of said range, on category basis.

23. The display method according to claim 19,
wherein an order of display array in the category is matched with each said object, and
wherein said step of changing the objects includes the steps of:
accepting a first command for selecting said object being displayed on said object display area, as a command for changing the object to be displayed on said object display area; and
in response to said first command, causing said display to change the objects to be displayed on said object display area on the category basis, so that objects belonging to a category to which the object corresponding to the selected object belongs are displayed in order from the first of said order of array.

24. The display method according to claim 20, wherein
an order of display array in the category is matched with each said marker and said object, respectively,
said markers and said objects are arrayed in order and displayed on the horizontal direction in said marker display area and said object display area, respectively,
said step to change the objects includes the steps of:
accepting a command for specifying a leftward direction as the first command, and accepting a command for specifying a rightward direction as the second command;
in response to said first command, causing said display to change to be displayed on said object display area on category basis, so that a leftmost object in a category to which an object that is displayed at a leftmost position at the time when said first command is accepted belongs, is displayed at a leftmost position in order from the first of said order of array; and
in response to said second command, causing said display to change the objects to be displayed on said object display area on category basis, so that a leftmost object in a category that is right-adjacent to a category to which an object that is displayed at a leftmost position at the time when said second command is accepted belongs, is displayed at a leftmost position in order from the first of said order of array.

25. The display method according to claim 21, wherein
an order of display array in the category is matched with each said marker and said object, respectively,
said markers and said objects are arrayed in order and displayed on the horizontal direction in said marker display area and said object display area, respectively,
said step to change the objects includes the steps of:
accepting a second command for specifying displayed marker on said marker display area; and
in response to said second command, causing said display to change the objects to be displayed on said object display area on category basis, so that the objects belonging to a category to which the object corresponding to the specified marker belongs are displayed at a leftmost position in order from the first of said order of array.

26. The display method according to claim 22, wherein
an order of display array in the category is matched with each said marker and said object, respectively,
said markers and said objects are arrayed in order and displayed on the horizontal direction in said marker display area and said object display area, respectively,
said step to change the objects includes the steps of:
accepting a command for specifying a leftward direction as the first command;
accepting a command for specifying a rightward direction as the second command;
in response to said first command, causing said display to change objects to be displayed on said object display area on category basis, so that a leftmost object in a category to which an object that is displayed at a leftmost position at the time when said first command is accepted belongs, is displayed at a leftmost position in order from the first of said order of array; and
in response to said second command, causing said display to change the objects to be displayed on said object display area on category basis, so that a leftmost object in a category that is right-adjacent to a category to which an object that is displayed at a leftmost position at the time when said second command is accepted belongs, is displayed at a leftmost position in order from the first of said order of array.

27. The display method according to claim 23, wherein
said objects are arrayed in order and displayed on the horizontal direction in said object display area,
said step to change the objects includes the steps of:
  accepting a second command for selecting said object being displayed on said object display area; and
  in response to said second command, causing said display to change the objects to be displayed on said object display area on category basis, so that objects belonging to a category to which the object corresponding to the selected object belongs are displayed at a leftmost position in order from the first of said order of array.

28. An image processing apparatus comprising:
a display including an object display area, which displays objects for setting functions, said object display area includes objects corresponding to a predetermined number of functions among a number of functions mounted on said image processing apparatus, said objects are arrayed in order and displayed on a horizontal direction in said object display area; and
a processor that causes said display to display said objects, which are grouped for every category according to a kind of said functions, wherein
an order of display array in the category is matched with said object,
said processor accepts a command for selecting said object being displayed on said display area, and
in response to said command, said processor causes said display to change the object to be displayed on said object display area on a category basis, so that objects belonging to a category, to which the object corresponding to the selected object belongs, are displayed at a left most position in order from the first of said order of array.

29. A display method of an image processing apparatus including a display and a processor, said display method comprising the steps of:
  causing said display, including an object display area, which displays objects for setting functions, said object display area includes objects corresponding to a predetermined number of functions among a number of functions mounted on said image processing apparatus, said objects are arrayed in order and displayed on a horizontal direction in said object display area, to display said objects which are grouped for every category according to a kind of said function; and
  in response to a command for selecting said object being displayed on said object display area, changing the objects to be displayed on said object display area on a category basis, wherein
said changing includes accepting the command for selecting said object being displayed on said object display area, and changing the objects to be displayed on said object display area on a category basis, in response to said command, so that objects belonging to a category, to which the object corresponding to the selected object belongs, are displayed at a leftmost position in order from the first of said order of array.

30. A non-transitory computer-readable storage medium storing a program thereon, when executed by a computer, said program causing the computer to execute the display method steps according to claim 29.

* * * * *